(12) United States Patent
Ryan et al.

(10) Patent No.: US 9,215,297 B2
(45) Date of Patent: Dec. 15, 2015

(54) EFFICIENT SIGNAL COMPRESSION FORMAT SCHEMES

(71) Applicant: Broadcom Corporation, Irvine, CA (US)

(72) Inventors: Timothy Andrew Ryan, San Francisco, CA (US); Shue-Lee Chang, San Jose, CA (US); Victor Simileysky, San Jose, CA (US)

(73) Assignee: BROADCOM CORPORATION, Irvine, CA (US)

( * ) Notice: Subject to any disclaimer, the term of this patent is extended or adjusted under 35 U.S.C. 154(b) by 136 days.

(21) Appl. No.: 14/071,037

(22) Filed: Nov. 4, 2013

(65) Prior Publication Data

US 2015/0117470 A1 Apr. 30, 2015

Related U.S. Application Data

(60) Provisional application No. 61/897,373, filed on Oct. 30, 2013.

(51) Int. Cl.
*H04L 29/06* (2006.01)
(52) U.S. Cl.
CPC .................................... *H04L 69/04* (2013.01)
(58) Field of Classification Search
CPC .............................. H04L 69/04; H04W 28/06
See application file for complete search history.

(56) References Cited

U.S. PATENT DOCUMENTS

| | | | |
|---|---|---|---|
| 2006/0018347 A1* | 1/2006 | Agrawal | 370/537 |
| 2012/0207206 A1* | 8/2012 | Samardzija et al. | 375/240 |
| 2014/0355683 A1* | 12/2014 | Ling et al. | 375/240.16 |

OTHER PUBLICATIONS

Bin Guo et al."CPRI compression transport for LTE and LTE-A signal in C-RAN", Aug. 2012, 7th International ICST Conference on Communications and Networking in China (CHINACOM).
Samardzija et al., "Compressed Transport of Baseband Signals in Radio Access Networks", IEEE Transactions on Wireless Communications, vol. 11, No. 9, Sep. 2012, pp. 3216-3225.
Allan Evans, "Using signal compression to ease migration to a 4G wireless infrastructure" EE Times—Using signal compression to ease migration to a 4G wireless infrastructure.

* cited by examiner

*Primary Examiner* — Mohammad Anwar
(74) *Attorney, Agent, or Firm* — Oblon, McClelland, Maier & Neustadt, L.L.P.

(57) ABSTRACT

Aspects of efficient signal compression format schemes are described. In various embodiments, samples are grouped into one or more blocks. One or more scaling factors are determined for the samples in the one or more blocks. In some cases, a block scaling factor is determined for each block. Further, in some embodiments, if a unique scaling factor exists among samples in a block, the position of the sample is identified. In turn, sign extension bits are scaled from the one or more blocks, and samples in the one or more blocks are quantized. In one embodiment, based on a number of sign extension bits scaled from the block and whether the unique scaling factor exists, a scaling code word is encoded for the block. In other embodiments, implicity, adaptive scaling, and/or adaptive quantization, for example, are used to increase the performance of the compression schemes.

20 Claims, 17 Drawing Sheets

```
                              Frame n
•••  ←——————————————————————————•——————————————————————————→  •••
              Block n                          Block n+1
         ┌─────────────────────────┐   ┌─────────────────────────┐
sig  ┌───┬───┬───┬───┬───┬───┬───┬───┬───┬────┬────┬────┐
     │ 1 │ 2 │ 3 │ 4 │ 5 │ 6 │ 7 │ 8 │ 9 │ 10 │ 11 │ 12 │
     └───┴───┴───┴───┴───┴───┴───┴───┴───┴────┴────┴────┘
log₂  -1  -3  -2  -1  -4  -3  -2  -2  -3  -3   -2   -2
Bits  15  15  15  15  15  15  15  15  15  15   15   15
```

FIG. 4A

```
                              Frame n
•••  ←——————————————————————————•——————————————————————————→  •••
  s, sig_q       Block n                       Block n+1
   ╲     ┌─────────────────────────┐   ┌─────────────────────────┐
    ┌──┬───┬───┬───┬───┬───┬───┬──┬───┬───┬────┬────┬────┐
    │▓▓│ 1 │ 2 │ 3 │ 4 │ 5 │ 6 │▓▓│ 7 │ 8 │ 9  │ 10 │ 11 │ 12 │
    └──┴───┴───┴───┴───┴───┴───┴──┴───┴───┴────┴────┴────┘
s    -1   ↖s_(n)                 -2  ↖s_(n+1)
Bits  4   6   6   6   6   6   6   4   6   6   6    6    6
```

FIG. 4B

EFFICIENT SIGNAL COMPRESSION FORMAT SCHEMES

CROSS-REFERENCE TO RELATED APPLICATIONS

This application claims the benefit of U.S. Provisional Application No. 61/897,373, filed Oct. 30, 2013, the entire contents of which is hereby incorporated herein by reference.

BACKGROUND

In cellular wireless communications technologies, including Global System for Mobile Communications (GSM), Code Division Multiple Access (CDMA), Universal Mobile Telecommunications System (UMTS), and Long Term Evolution (LTE) technologies, for example, Remote Radio Head (RRH) equipment is used in connection with base transceiver stations. RRHs are generally used to provide and extend coverage into wide geographic areas. Often an RRH is connected to a base transceiver station via a fiber optic cable using standard protocols.

Among other elements, RRHs include radio frequency (RF) circuitry, analog-to-digital (ADC) converters, digital-to-analog (DAC) converters, and other associated communications elements. Typically, RRHs help facilitate relatively quick and simple deployment of cellular wireless communications into expanding geographic areas.

BRIEF DESCRIPTION OF THE DRAWINGS

For a more complete understanding of the embodiments and the advantages thereof, reference is now made to the following description, in conjunction with the accompanying figures briefly described as follows:

FIG. 4A illustrates part of a frame communicated by a communications system according to an example embodiment.

FIG. 4B illustrates part of a frame communicated by the communications system of FIG. 1 according to an example embodiment.

Figure 1:
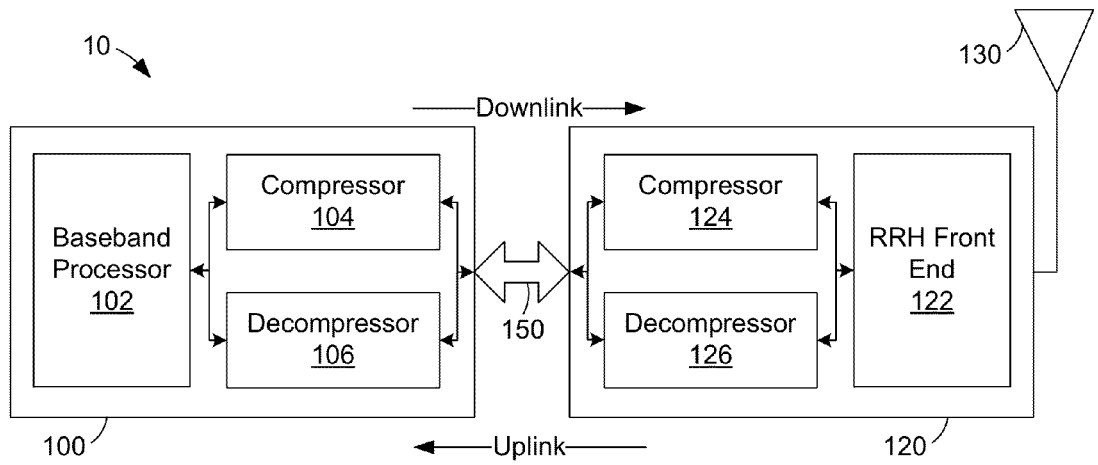
FIG. 1 illustrates a communications system that operates using efficient signal compression format schemes according to an example embodiment.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positions of elements and features may be exaggerated to help visually convey certain principles. In the drawings, similar reference numerals between figures designate like or corresponding, but not necessarily the same, elements.

DETAILED DESCRIPTION

In the following paragraphs, various embodiments are described in further detail by way of example with reference to the attached drawings. In the description, well known components, methods, and/or processing techniques are omitted or briefly described so as not to obscure the embodiments.

As the demand for wireless networks continues to develop, the coexistence and further development of various cellular communications schemes (e.g., 2G, 3G, and 4G LTE and variants thereof) will continue. With rising data rates and an increased density of mobile users, higher demands are being placed on wireless network infrastructures, and the infrastructures may need to be updated and/or redesigned to handle the additional workload. In an LTE network, for example, base stations may be deployed relatively more densely than in 2G and 3G networks. In this context, the infrastructure costs for LTE networks are of particular concern for network operators and their partners.

Turning now to the drawings, a description of exemplary embodiments of a system and its components are provided, followed by a discussion of the operation of the same.

FIG. 1 illustrates a communications system 10 that operates using efficient signal compression format schemes according to an example embodiment. Among embodiments, the system 10 may be embodied as a cellular communications system. Among other elements, the communications system 10 includes a base transceiver 100, an RRH 120, and a transport channel 150. The base transceiver 100 may be housed in a baseband cabinet, for example, and be co-located with the RRH 120, which may be mounted to a cellular tower or mast. In other embodiments, rather than being co-located with the RRH 120, the base transceiver 100 may be located at some geographic distance from the RRH 120.

Among other elements, the base transceiver 100 includes a baseband processor 102, a compressor 104, and a decompressor 106. Also, among other elements, the RRH 120 includes a compressor 124, a decompressor 126, a RRH front end 122, and one or more antennas or antenna elements 130. It should be appreciated that the elements of the base transceiver 100 and the RRH 120 are provided by way of example and not limitation, and the base transceiver 100 and the RRH 120 may include additional and/or alternative elements.

Generally, in the downlink direction of the system 10, the base transceiver 100 receives, processes, and compresses data. The base transceiver 100 communicates the compressed data to the RRH 120 via the transport channel 150. In turn, the RRH 120 receives the compressed data from the base transceiver 100, decompresses the compressed data, and wirelessly transmits the decompressed data via the one or more antennas or antenna elements 130 using the RRH front end 122. In the uplink direction of the system 10, the RRH 120 wirelessly receives data via the one or more antennas or antenna elements 130, compresses the data, and communicates the compressed data to the base transceiver 100 via the transport channel 150. In turn, the base transceiver 100 receives the compressed data from the RRH 120, and decompresses and processes the compressed data.

The baseband processor 102 may be embodied as one or more general- or specific-purpose processors or processing circuits structured in any suitable static or elastic (e.g., adaptive, cloud, etc.) computing configuration generally configured to process baseband data for communication. In various embodiments, the baseband processor 102 may process data for wireless communication by one or more RRHs similar to the RRH 120. Each of the compressor 104, the decompressor 106, the compressor 124, and the decompressor 126 may be embodied as one or more general- or specific-purpose processors or processing circuits. Further, each is configured to compress and/or decompress data according to one or more of the efficient signal compression format schemes described herein. The RRH front end 122 may be embodied as one or more general- or specific-purpose processors or processing circuits, one or more ADC circuits, DAC circuits, amplifiers, filters, etc., for a physical layer front end of a cellular communications radio head. It should be appreciated that the example structural elements of the baseband processor 102, the compressors and decompressors 104, 106, 124, and 126, and the RRH front end 122 are described and illustrated by way of example and not limitation. The baseband processor 102, the compressors and decompressors 102, 104, 124, and 126, and the RRH front end 122 may additionally include, for example, digital down converters (DDCs) and up converter (DUCs), serializers, de-serializers, multiplexers, de-multiplexers, channel filters, phase-locked-loops (PLLs), etc., to facilitate communications according to various cellular communications standards.

In communications systems such as the system 10, compressed baseband samples are typically communicated via a transport channel, such as the transport channel 150, between a baseband transceiver and an RRH using open base station architecture initiative (OBSAI) or common public radio interface (CPRI) communications specifications, for example. In this example context, the transport channel 250 may include one or more fiber optic links in a fiber-to-the-antenna (FTTA) installation. FTTA installations may be adopted in place of coaxial transports to support advanced technologies such as 4G LTE, which generally rely upon multiple-in-multiple-out (MIMO) antennas.

If the base transceiver 100 is co-located with the RRH 120, the fiber optic length of the transport channel 150 may one or two hundred feet, for example, and support communications for only the RRH 120. However, for residential coverage or coverage along highways, for example, several RRHs may be communicatively coupled together using a relatively longer fiber optic transport channel. In this case, the longer transport channel may be relied upon to support communications for several RRHs at a relatively higher aggregate data rate. It is also noted that next generation wireless access network architectures, such as the cloud radio access network (C-RAN) architecture, for example, introduce new and flexible technologies but lead to relatively higher data rates. These higher data rates directly affect installation (e.g., fiber, hardware, etc.) and/or operating costs. In certain C-RAN architectures, several remote RF units (RRUs) are connected to baseband unit (BBU) pools, and fiber optic links are relied upon to communicate data from the BBU pools to the RRUs.

To the extent possible, the rate at which data is communicated between baseband transceivers and remote radio units (e.g., between BBU pools and RRUs, between the base transceiver 100 and the RRH 120, etc.) should be reduced to enable or maintain the use of low cost fiber optic links and associated transceivers. If signal compression is applied, data may be sent over fiber optic cables at higher rates, and new and existing cellular infrastructures and the management thereof may be simplified. In this example context, the embodiments described herein are directed to new systems, architectures, methods, and applications of signal compression.

Figure 2:
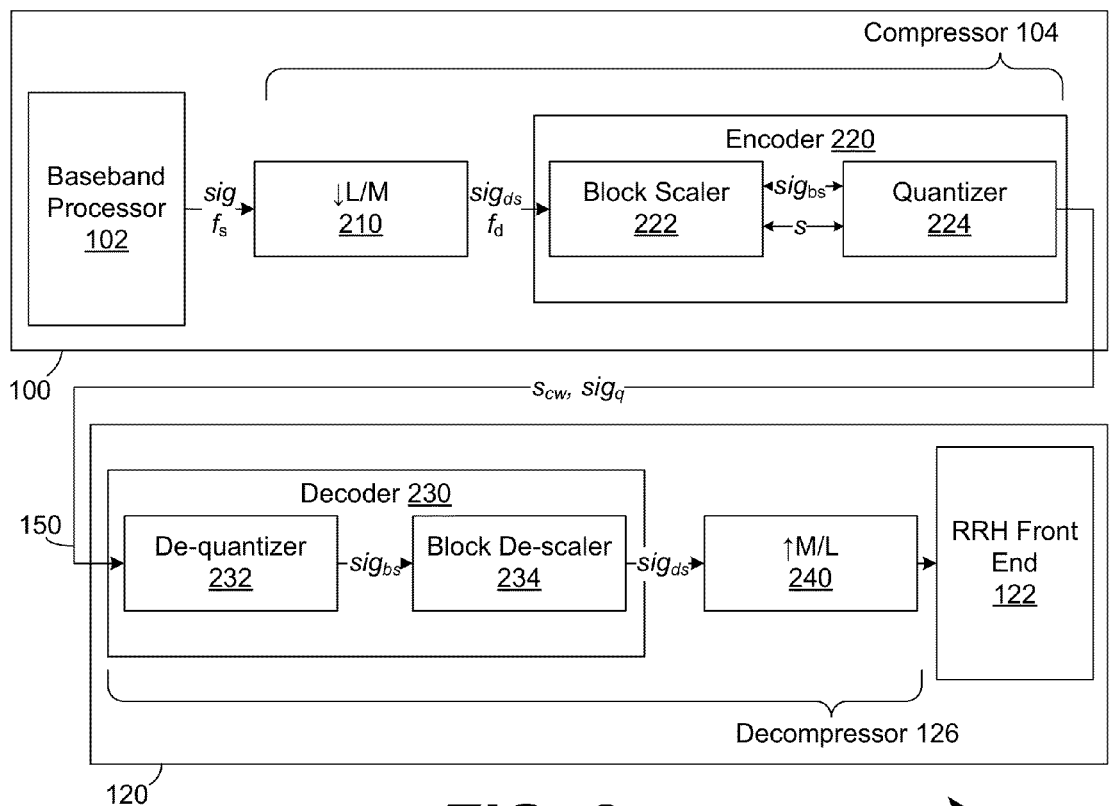
FIG. 2 illustrates compressor and decompressor system elements relied upon in the communications system of FIG. 1 according to an example embodiment.

Turning to FIG. 2, compressor and decompressor system elements relied upon in the communications system 10 of FIG. 1 are further illustrated, according to an example embodiment. Here, it is noted that the baseband processor 102 generates a sequence of samples sig and provides the sequence of samples sig to the compressor 104, as illustrated in FIG. 2. Generally, in FIG. 2, the sequence of samples sig is described in the context of downlink flow in the system 10 (i.e., from baseband processor 102, to RRH 120, and to user equipment). The system 10 operates in a similar, but reverse flow, to process sequences of samples in an uplink flow. The sequence of samples sig may be a sequence of complex in-phase (i.e., real) and quadrature (i.e., imaginary) (I/Q) samples, for example. Further, it is noted that, among embodiments, the sequence of samples sig may be representative of a bundle of samples for different user equipment devices, service providers, customers, etc. It should be appreciated that, among embodiments, the sequence of samples sig may be formatted by an encoder according to any sample size, block size, frame size, packet size, rate, etc. suitable for the application. Further, the data in the sequence of samples sig may be representative of any data, such as communications, control, or other data, without limitation.

As illustrated in FIG. 2, the compressor 104 includes a decimator 210 and an encoder 220. The encoder 220 includes a block scaler 222 and a quantizer 224. Generally, in the downlink direction of the system 10, the compressor 104 receives the sequence of samples sig from the baseband processor 102, compresses the sequence of samples sig, and outputs a compressed sequence of samples $sig_q$. The compressed sequence of samples $sig_q$ is communicated by the base transceiver 100 to the decompressor 126 of the RRH 120 via the transport channel 150.

The decompressor 126 includes a decoder 230 and an interpolator 240. The decoder 230 includes a de-quantizer 232 and a block de-scaler 234. In the downlink direction of the system 10, the compressed sequence of samples $sig_q$ is received by the decompressor 126, decompressed, and converted to a radio signal for wireless transmission by the RRH front end 122. Conversely, in the uplink direction of the system 10, the compressor 124 and the decompressor 106 operate in a manner which is similar to that of the compressor 104 and the decompressor 126. As such, the compressor 124 generally includes the same functional and structural elements as the compressor 104, and the decompressor 106 generally includes the same functional and structural elements as the decompressor 126. The operations of the compressors and decompressors 104, 106, 124, and 126 are described in further detail below.

A. Decimation

Figure 3:
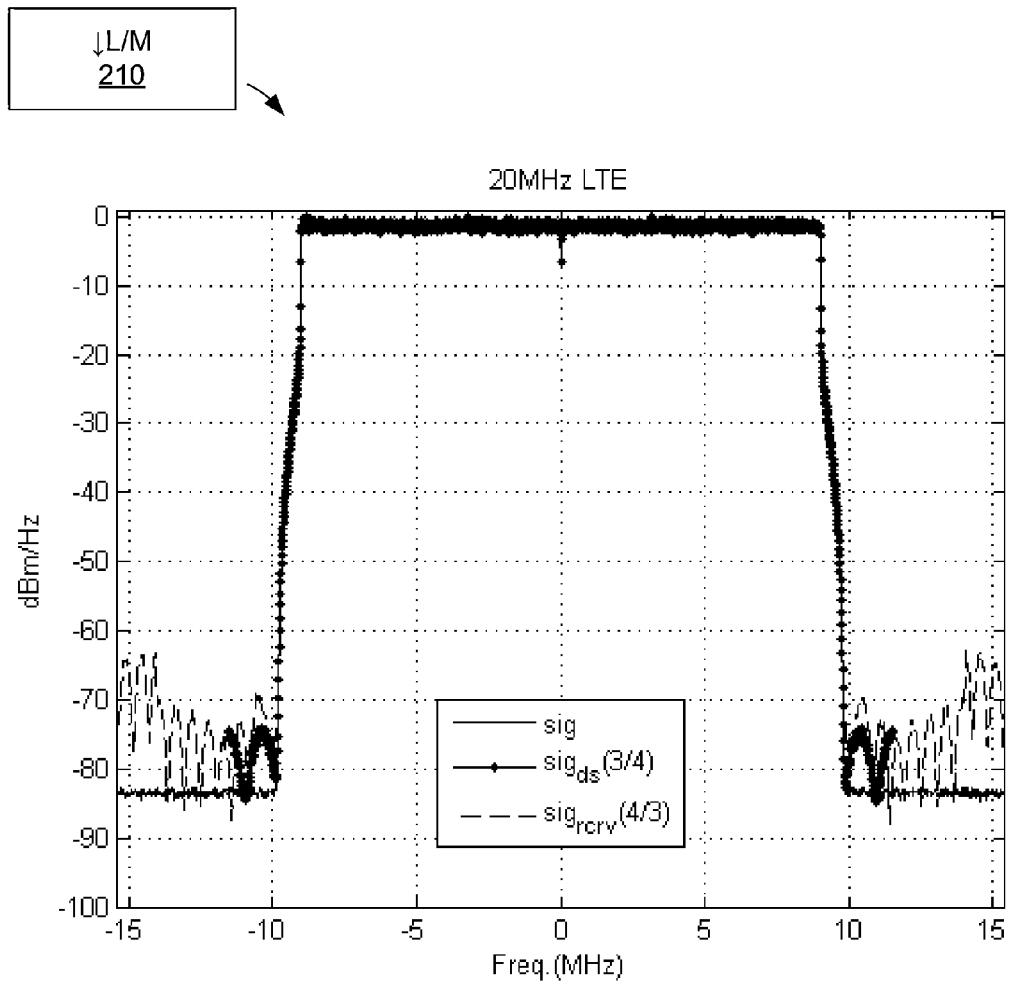
FIG. 3 illustrates an envelope of signal strength across frequencies for an original signal, a decimated signal, and a received signal, according to one example embodiment of the communications system of FIG. 1.

The decimator 210 is relied upon in the system 10 to remove a certain amount redundancy from the sequence of samples sig. In this context, the decimator 210 provides a sequence of L output samples for every M input samples. For example, in one embodiment, for every four samples of the sequence of samples sig, the decimator 210 outputs a sequence of three representative decimated samples $sig_{ds}$. In this context, a filter length and filter coefficients of the decimator 210 may be selected to result in a reasonably small overall latency and low signal distortion, as illustrated in FIG. 3. FIG. 3 illustrates an envelope of signal strength across frequencies for the sequence of samples sig, the sequence of decimated samples $sig_{ds}$, and a received signal $sig_{rcrv}$, according to one example embodiment of the communications system of FIG. 1.

As one configuration for the decimator 210, in a 20 MHz LTE example case, the decimator 210 may be configured to lower a sampling rate $f_s$ of the sequence of samples sig from 30.72 MHz down to a sampling rate $f_{ds}$ of 23.04 MHz, with L=3, M=4, and N=81, for the decimated sequence of samples $sig_{ds}$. It is noted that the selection of L and M impacts the format and length of compressed data which is communicated over the transport channel 150. In other words, according to one example format for communication over the transport channel 150, samples may be formatted for communication over the transport channel 150 as 8 samples/frame with 15 bits/sample (i.e., 120 bits/frame), although other formats are within the scope and spirit of the embodiments described herein. For ease of implementation and compatibility, it may be desirable to choose L and M to maintain an integer scalar multiple of 120 bits/frame. In this way, it may be easier to delineate block and/or frame boundaries during decompression, for example. According to one embodiment, L and M are selected as 3 and 4, respectively, as further provided in the examples described below.

B. Block Grouping, Scaling, Trimming

The encoder 220 is relied upon in the system 10 to group a set of the decimated sequence of samples $sig_{ds}$ into a block of Ns decimated samples and determine a scaling factor for the Ns decimated samples in the block. In turn, the block scaler 222 is relied upon in the system 10 to scale or trim sign extension bits from at least one of the decimated samples in the block. In various embodiments, the encoder 220 may group any suitable number of decimated samples Ns, such as 2, 3, 4, 5, or 6 samples, for example, in a block of samples. According to various embodiments described herein, the number of decimated samples Ns per block may be determined based on compatibility with suitable and/or expected block or frame boundaries. As another consideration, the number of decimated samples Ns per block may be selected to balance the overhead of communicating scaling code words or scaling factors against the overall reduction and consistency in the noise floor which may be achieved with smaller Ns values. It is noted that, in some embodiments, the number of decimated samples Ns may vary or be variable across sequential blocks.

Before continuing, it should be appreciated that, in certain embodiments, the block scaler 222 may operate using a sequence of samples which were not decimated. In other words, the decimator 210 of FIG. 2 may be omitted in certain embodiments, and the block scaler 222 may operate using the sequence of samples sig from the baseband processor 102.

In certain embodiments, the encoder 220 and/or the block scaler 222 determine a scaling factor for one, at least one, or each of the decimated samples in the block. The scaling factor may be determined according to a number of sign extension bits which may be scaled or trimmed from one, at least one, or each of the decimated samples in the block. In some embodiments, the encoder 220 and/or the block scaler 222 may also determine whether a unique scaling factor exists among the decimated samples in the block. For example, if a scaling factor is determined for each decimated sample in a block, the encoder 220 may identify whether a unique minimum scaling factor exists among the scaling factors for the decimated samples in the block, as further described below.

Table 1 below includes representative examples of measured and digitally converted (i.e., ADC converted) decimated samples $sig_{ds}$. In Table 1, four decimated samples are grouped into a first block (i.e., Ns=4), and four decimated samples are grouped into a second block. Here, it should be appreciated that the encoder 220 may group any number of decimated samples into a block of samples, such as 2, 3, 4, 5, or 6 samples, for example, without limitation. As outlined above, for each block of Ns decimated samples, the encoder 220 and/or the block scaler 222 determines one or more scaling factors for the decimated samples in the block. In this context, it is noted that one or more redundant sign extension bits may be removed from the Ns decimated samples in a block. As further described below, in place the redundant sign extension bits, the encoder 220 generates a scaling factor s which is representative of the number of redundant sign extensions bits scaled (e.g., removed, omitted, trimmed, etc.) from one or more decimated samples within the block.

In the case of real and imaginary samples, for the k-th block of Ns samples, a scaling factor, s, of the largest number of sign extension bits that can be scaled or trimmed from a block of samples is determined according to expression A, as follows:

$$s_{real\ or\ imag} = \max_{i=Ns*k,\ ...Ns*(k-1)+1} [\log_2(|real(s_{ds}(i))|\ or\ \log_2(|real(s_{ds}(i))|)] \quad (A)$$

Generally, the scaling factor s is an indicator of the maximum number of redundant sign bits that can be scaled or trimmed without negatively affecting the fixed-point precision in a block of Ns decimated samples. In Table 1, the redundant sign extension bits of each decimated (and converted) sample $sig_{ds}$ are identified using squared brackets, along with the associated $\log_2$ evaluation of each decimated sample. According to the evaluation of expression A above, for blocks 1 and 2, each of which is formed of 4 decimated samples $sig_{ds}$, 1 and 3 sign extension bits, respectively, can be scaled or trimmed without negatively affecting the fixed-point precision in either block. Again, in this example, the maximum number of redundant sign bits that can be scaled is determined according to the maximum number of which may be removed from all decimated samples in the block, without negatively affecting the fixed-point precision of any decimated sample in the block.

TABLE 1

| Block | Sample | $sig_{ds}$<br><Measured> | $sig_{ds}$<br><Converted -15 bits> | $\log_2$ |
|---|---|---|---|---|
| 1 | 1 | 0.09710693359375 | [111]100111001001 | −3 |
|   | 2 | 0.27215576171875 | [0]01000101101011 | −1 |
|   | 3 | 0.12817382812500 | [00]0100000110100 | −2 |
|   | 4 | 0.06066894531250 | [1111]10000011110 | −4 |
| 2 | 5 | 0.05822753906250 | [0000]01110111010 | −4 |
|   | 6 | 0.00012207031250 | [000000000000]010 | −12 |
|   | 7 | 0.07214355468750 | [000]010010011110 | −3 |
|   | 8 | 0.08251953125000 | [111]101010111000 | −3 |
| 3 | ... | ... | ... | ... |
| 4 | ... | ... | ... | ... |
| ... | ... | ... | ... | ... |

Once identified, the block scaler 222 may scale or trim the redundant sign extension bits from the decimated samples. In Table 1, the redundant sign extension bits of each decimated sample $sig_{ds}$ that are scaled or trimmed by the block scaler 222 are identified using squared brackets. According to one aspect of the embodiments, a scaling factor s is transmitted for each block of samples. The scaling factor s is representative of the number of redundant sign extension bits which were scaled or trimmed the decimated samples in the block, and this scaled number of redundant sign extension bits is taken into account during decoding.

Here, it should be appreciated that the quantization error for each block, as further described below, may be reduced by lowering the number Ns of decimated samples per block. That is, if each block were embodied as a single sample, the maximum number of sign extension bits could be scaled or trimmed for each block (and each sample), because it would not be necessary to determine an overall maximum number of redundant sign extension bits which may be scaled without negatively affecting the fixed-point precision of any sample in the block. In this context, it is noted that the number of decimated samples per block Ns is a design parameter which may be selected based on a tradeoff analysis which balances signal quality with data throughput and/or transport rates.

C. Quantization

After being decimated by the decimator 210 and scaled by the block scaler 222, a decimated and scaled sequence $sig_{bs}$ of samples is quantized by the quantizer 224, which provides a quantized sequence of samples $sig_q$. Generally, quantization is performed by the quantizer 224 on a sample by sample basis according to one of the quantization processes described herein. In various embodiments, the number of bits Qq for quantizing a sample may be explicit or fixed for each sample of each block. In other embodiments, the number of bits Qq may vary or be variable among samples in one block and/or among blocks.

After quantization, generally, the encoder 220 frames the scaling factor s and the block of quantized samples $sig_q$ (with other code words and blocks of samples) into a suitable package (e.g., frame, packet, etc.) and format for communication over the transport channel 150. The decompressor 126 of the RRH 120 receives the scaling factor s and the block of quantized samples $sig_q$. The decoder 230 identifies and decodes the scaling factor s, the de-quantizer 232 de-quantizes the block of quantized samples $sig_q$ and provides a block or sequence of scaled samples $sig_{bs}$ to the block de-scaler 234. The block de-scaler 234 de-scales the scaled samples, and provides a block or sequence of decimated samples $sig_{ds}$ to the interpolator 140. The interpolator 240 interpolates the de-scaled samples from the block de-scaler 234. Finally, data from the samples is wirelessly transmitted via the RRH front end 122.

D. Encoder and Decoder Architectures

Various encoder and decoder architectures are described herein. For example, because tradeoffs may be balanced between block scaling and quantization, certain types and operations of block scalers and quantizers may be preferred for certain applications in communications, when choosing a suitable performance for the system 10. Generally, the block scalers and quantizers described below operate according to the principles of one or a combination of: (a) explicit Qq-MSB quantization (b) optimal Scalar Quantization Table (SQT) quantization, (c) implicit Qq-MSB quantization, (d) explicit variable-MSB adaptive quantization, and (e) multi-dimensional implicit adaptive quantization.

D.1 Explicit Qq-MSB Quantization

For example context in connection with explicit quantization by the quantizer 224 (FIG. 2), Table 2 below includes representative examples of decimated samples $sig_{ds}$, scaled or trimmed sign extension bits, and quantized bits $sig_q$ of decimated samples. In one embodiment, the quantizer 224 quantizes at least one decimated sample in a block to provide a quantized block of samples. In other embodiments, the quantizer 224 quantizes each decimated sample in the block to provide a quantized block of samples.

The resolution or number of bits Qq for quantizing may be determined for suitable performance of the system 10, along with a balance of other considerations described herein. As further described below, the performance of the system 10 may be evaluated by Root-Mean-Square (RMS) Error Vector Magnitude (EVM) measurements. It should be appreciated that a higher Qq resolution will improve signal quality (i.e., provide lower quantization error), while increasing data throughput and/or transport rates. Thus, the number of bits for quantizing Qq is a design parameter which may be derived from a tradeoff analysis which balances signal quality with data throughput and/or transport rates.

According to certain examples described herein (and in Table 2 below), the number of bits Qq for quantizing is selected to be 6. In other embodiments, the number of bits Qq may be greater or less than 6. In still other embodiments, the number of bits Qq may vary or be variable among samples in one block and/or among samples across blocks.

TABLE 2

| Block | Sample | sig$_{ds}$ <Measured> | sig$_{ds}$ <Converted -15 bits> | s | sig$_q$ <6 bits> |
|---|---|---|---|---|---|
| 1 | 1 | 0.09710693359375 | [1]{111001}11001001 | 1 | 111010 |
|   | 2 | 0.27215576171875 | [0]{010001}01101011 | 1 | 010001 |
|   | 3 | 0.12817382812500 | [0]{001000}00110100 | 1 | 001000 |
|   | 4 | 0.06066894531250 | [1]{111100}00011110 | 1 | 111100 |
| 2 | 5 | 0.05822753906250 | [000]{001110}111010 | 3 | 001111 |
|   | 6 | 0.00012207031250 | [000]{000000}000010 | 3 | 000000 |
|   | 7 | 0.07214355468750 | [000]{010010}011110 | 3 | 010010 |
|   | 8 | 0.08251953125000 | [111]{101010}111000 | 3 | 101011 |
| 3 | ... | ... | ... | ... | ... |
| 4 | ... | ... | ... | ... | ... |
| ... | ... | ... | ... | ... | ... |

In Table 2, the quantized bits of each decimated sample are identified using curled brackets. As outlined in Table 2, the quantized bits sig$_q$ of a decimated sample include the 6 next Most Significant Bits (MSBs) of the decimated sample after the scaled or trimmed sign extension bits. It is noted that, in one embodiment, the quantized bits sig$_q$ may be rounded. In other words, for sample 1 of block 1 in Table 2, the bits 111001 are rounded to 111010. In other embodiments, the quantized bits sig$_q$ may be determined directly from the MSBs of each decimated sample without rounding.

The number of bits Qs for communicating the scaling factor s may be determined for suitable performance of the system 10, along with a balance of other considerations described herein. It should be appreciated that a higher Qs resolution will increase data throughput and/or transport rates. Thus, the number of bits Qs for the scaling factor s is a design parameter which may be derived from a tradeoff analysis which balances signal quality with data throughput and/or transport rates. According to certain examples described herein, the number of bits Qs for communicating the scaling factor s (or the scaling code word s$_{cw}$, as described below) is 4. In other embodiments, the number of bits Qs may be greater or less than 4. In still other embodiments, the number of bits Qs may vary or be variable among blocks in a frame.

FIG. 4A illustrates part of a frame communicated by a communications system according to an example embodiment. As illustrated, a sequence of samples sig is communicated in blocks of a frame. The sequence of samples sig may be communicated over a transport channel similar to the transport channel 150 of FIG. 1, for example. In the example of FIG. 4A, each sample is embodied as 15 bits, and the associated log$_2$ evaluation (i.e., expression A above) of each sample is illustrated.

FIG. 4B illustrates part of a frame communicated by the communications system 10 of FIG. 1 according to an example embodiment. The encoder 220 may package any suitable number of blocks into each frame, packet, or combination thereof, as a communications data package, according to various considerations, such as expected frame or packet boundaries, communications control overhead, communications control processing, etc.

In FIG. 4B, the samples sig from FIG. 4A are decimated, scaled, and quantized, and a sequence of quantized samples sig$_q$ is communicated in blocks of a frame over the transport channel 150 of FIG. 1, for example. Also, for each of the blocks 1, n+1, etc., a scaling factor s is added at the front end of the block. In other embodiments, the scaling factor s may be added or inserted at other locations within a block. For block n in FIG. 4B, the scaling factor s is encoded to be representative of or identify that 1 sign extension bit is scaled or trimmed, for example, from each of the samples 1-6 in block n. Similarly, for block n+1 in FIG. 4B, the scaling factor s is encoded to be representative of or identify that 2 sign extension bits are scaled or trimmed from each of the samples 7-12 in block n+1.

When comparing the total number of bits communicated in the blocks illustrated in FIG. 4A verses FIG. 4B, it is apparent that the use of decimation, quantization, and sign extension bits results in a reduced overall data throughput and/or transport rate. For example, for the 12 samples communicated in FIG. 4A, each including 15 bits of data, 180 bits of data are communicated. In contrast, in FIG. 4B, for the 12 samples, each including 6 bits of data, and the 2 scaling factors s, each including 4 bits of data, 80 bits of data are communicated.

As another example, for a frame or block of 8 samples, each including 15 bits of data, 120 bits of data are communicated. In contrast, after decimation of the 8 samples into 6 samples by the decimator 210 (i.e., L/M=3/4), and after scaling and quantizing each of the 6 samples from 15 bits to 6 bits by the block scaler 222 and the quantizer 224, a frame or block of 36 bits of data are communicated. Additionally, for a block of 6 samples including 36 bits, one scaling factor s including 4 bits of data may be communicated, for a total of 40 bits in a block of samples. According to this example, the total number of bits is reduced by $\frac{2}{3}$, from 120 bits to 40 bits.

Additionally, as described above, at least to a certain extent, the use of the scaling factor s is less efficient as the number of samples Ns increases per block. Thus, in one embodiment, a block of 6 samples and a scaling factor s of 4 Qs bits is split into a pair of blocks each having 3 samples and a corresponding pair scaling factors each having 2 Qs bits, as further outlined below.

D.2 Optimal Scalar Quantization

In certain embodiments, the quantizer 224 may rely upon an optimized, non-linear, quantization table. In this case, optimized distances are used between quantization levels based on a data probability distribution for the sequence of samples sig or the decimated sequence of samples sig$_{ds}$. In some cases, the optimized distances may result in lower quantization error and improved signal quality. According to one embodiment, the adaptive Llyod-Max algorithm can be applied to obtain an optimal Scalar Quantization Table (SQT) to achieve Minimum Mean Square Error (MMSE) based on the data probability distribution for the sequence of samples sig or the decimated sequence of samples sig$_{ds}$. The quantizer 224 may then quantize the scaled and decimated samples according to the levels of the optimal SQT. When relying upon an optimal SQT, rather than simply identifying the next Qq MSBs of a decimated sample for quantizing and transmitting them directly, the quantizer 224 applies the next Qq MSBs to the optimal SQT table in a type of lookup process, and a quantized value is returned as a result. This quantized value is transmitted in place of the next Qq MSBs. When decoding, the de-quantizer (e.g., the de-quantizer 232) references a corresponding optimal SQT, to identify the Qq MSBs which were transmitted.

Figure 5A:
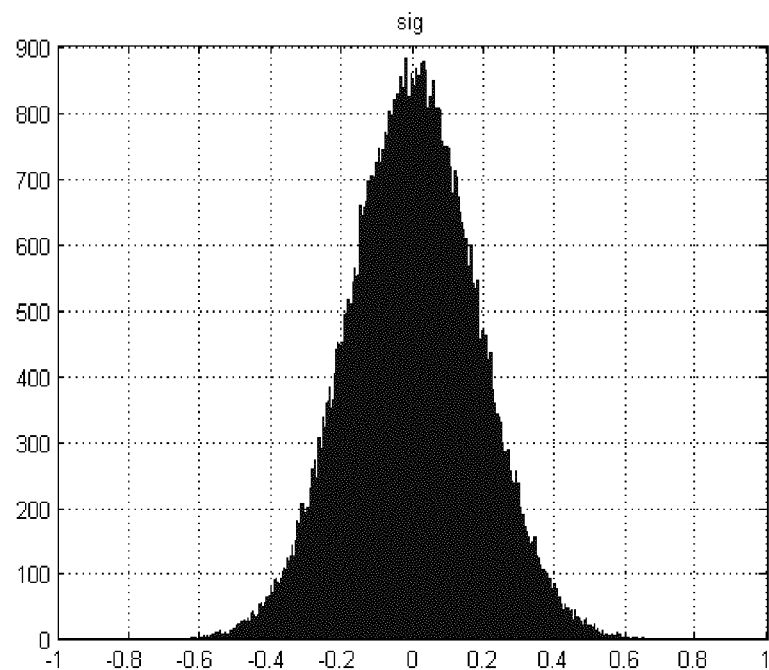
FIG. 5A illustrates a distribution histogram for a sequence of samples in the communications system of FIG. 1 according to an example embodiment.
Figure 5B:
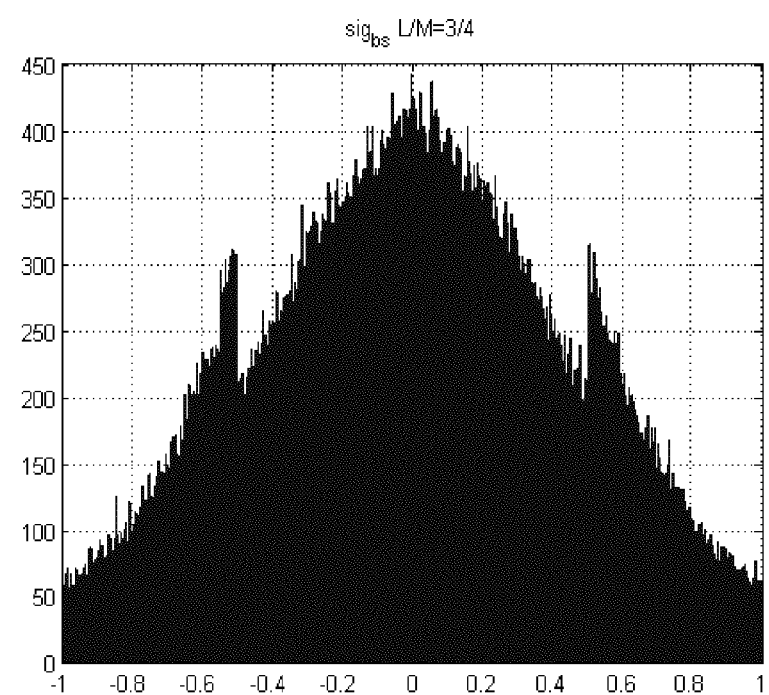
FIG. 5B illustrates a distribution histogram for a decimated and scaled sequence of samples in the communications system of FIG. 1 according to an example embodiment.

The use of an optimal SQT assumes that the Probability Density Function (PDF) of the sequence of samples sig or the decimated sequence of samples sig$_{ds}$ is embodied as a mid-rise function with monotonic decay on both sides, such as a Gaussian or a Laplace distribution. A typical Gaussian distribution histogram the sequence of samples sig is illustrated in FIG. 5A. It is noted that, after being processed by the decimator 210 and the block scaler 222, the histogram may not be strictly embodied as monotonic decay, as illustrated in FIG. 5B for the decimated sequence of samples sig$_{ds}$. Here, it is noted that scaling or trimming performed by the block scaler 222 may change the distribution, particularly if the scaling or trimming is applied variable across blocks according to a function of neighboring samples in each block. In some embodiments, the quantizer 224 and the de-quantizer 232 may rely upon an optimal SQT determined by the Llyod-Max algorithm (or a similar algorithm) to minimize quantization error to at least some extent, although some monotonic decay may be lost in the PDF of the sequence of samples sig after it is processed by the decimator 210 and the block scaler 222.

D.3 Implicit Qq-MSB Quantization

Figure 6A:
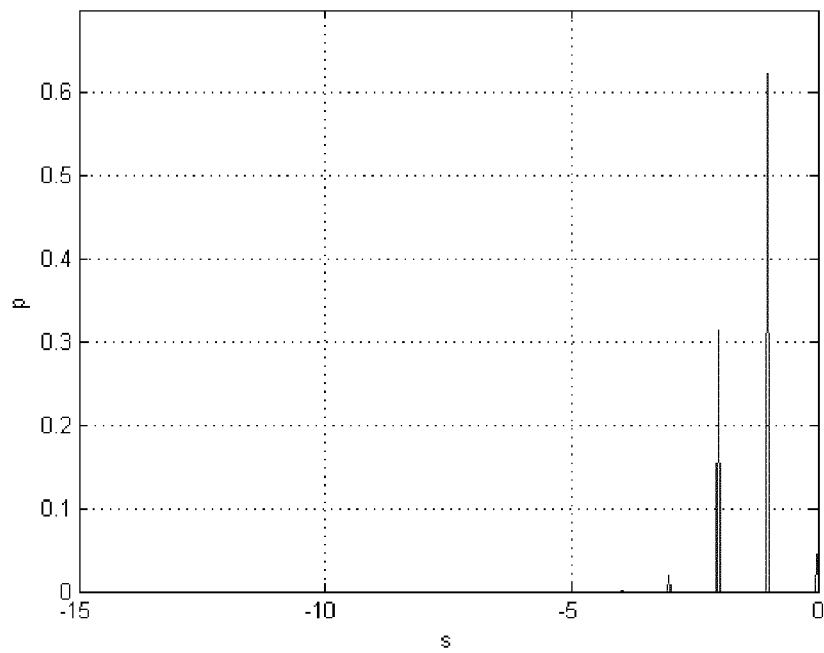
FIG. 6A illustrates a probability distribution of various states of a sign extension code word used for explicit quantization in the communications system of FIG. 1 according to an example embodiment.

FIG. 6A illustrates a probability distribution of various states of the scaling factor s used for explicit quantization in the communications system of FIG. 1 according to an example embodiment. It is noted that, with 4 Qs bits for communicating the scaling factor s, 16 unique states of the scaling factor s are available. For the example illustrated in FIG. 6A, the likelihood or probability that the block scaler 222 will scale or trim one bit from each decimated sample in a block of 6 decimated samples is relatively high, at over 0.6. However, the likelihood that the block scaler 222 will scale or trim more than one bit trails off quickly, to about 0.3 for 2 bits and less than 0.05 for 3 bits. Here, it should be appreciated that the number of samples per block impacts the distribution of the probability of the state of the scaling factor s, as described above. In the example of 6 decimated samples in each block, for the case illustrated in FIG. 6A, it is noted that most of the states of the scaling factor s are underutilized, which leads to inefficiency.

In this context, if a sample having a unique scaling factor exists in the block, underutilized states in the scaling factor s, may be repurposed to identify the position of a sample having a unique scaling factor. In this case, as described below, one additional redundant sign extension bit can be scaled from each sample in the block, using implicity. Thus, the number of scaled or trimmed sign extension bits is increased by one for each sample in the block. In this manner, quantization error may be further reduced, because additional granularity is obtained using an additional MSB after the scaled or trimmed bits.

Referring again to Table 1 above, sample 2 of block 1 has a unique minimum number of sign extension bits which may be scaled or trimmed in block 1. Particularly, for sample 2, a unique minimum number of 1 sign extension bit (which also corresponds to a unique maximum $\log_2$ value for the sample) may be scaled from sample 2 in block 1. According to aspects of implicit quantization described herein, the position of sample 2 in block 1 may be encoded as a state of a scaling code word $s_{cw}$, and an additional sign extension bit may be scaled from each decimated sample in block 1. Because the unique minimum may be associated with a sample located at any position in a block, Ns conditions of the scaling code word $s_{cw}$ must be repurposed to encode the position of the sample having the unique minimum.

Figure 7:
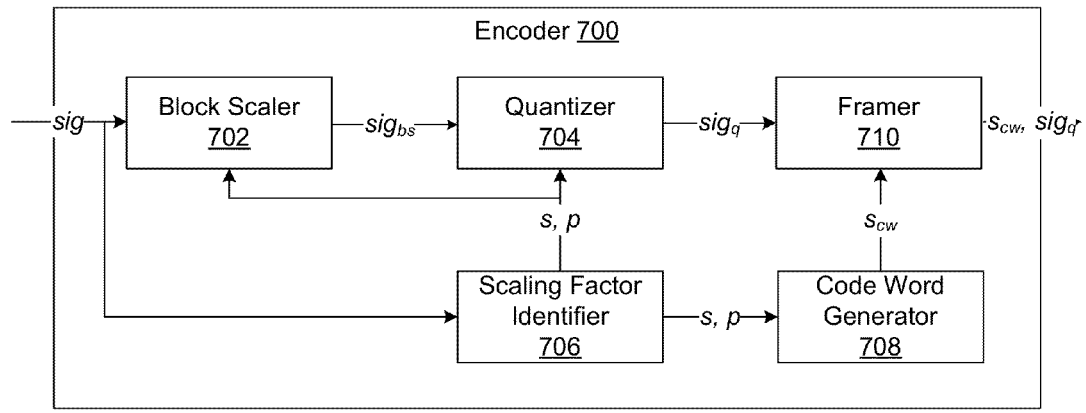
FIG. 7 illustrates an example encoder using implicity in the communications system of FIG. 2 according to an example embodiment.

FIG. 7 illustrates an example encoder 700 using implicity in the communications system of FIG. 2 according to an example embodiment. In one embodiment, the encoder 700 may be relied upon in place of the encoder 220 in FIG. 2. The encoder 700 includes a block scaler 702, a quantizer 704, a scaling factor identifier 706, a code word generator 708, and a framer 710. Generally, the elements of the encoder 700 may be embodied as one or more general- or specific-purpose processors or processing circuits. According to the example described below, the encoder 700 operates using blocks having Ns=6 samples. The encoder 700 also operates using 4 Qs bits for the scaling code word $s_{cw}$ of each block, and 6 Qq bits for quantizing the samples in each block. It should be appreciated, however, that alternative applications of or constraints on the number of Ns samples, Qs bits, and Qq bits are within the scope and spirit of the embodiments described herein.

The block scaler 702 and the quantizer 704 operate in a manner which is similar to the block scaler 222 and the quantizer 224 in the encoder 220 of FIG. 2, although operating according to the use of implicity as described below. That is, the quantizer 704 operates as an implicit Qq-MSB quantizer. To assist the quantizer 704, the scaling factor identifier 706 identifies redundant sign bits in blocks of received samples. In some embodiments, the scaling factor identifier 706 identifies redundant sign extension bits for each sample in a block. Based on the number of redundant sign extension bits for each sample, the scaling factor identifier 706 determines a scaling factor for each sample in the block. As described above, the scaling factor for any given sample is related to the number of redundant sign bits which may be scaled or trimmed from the given sample.

With reference to Table 1 above, for example, the scaling factor identifier 706 may determine a respective scaling factor s for each of the samples 1-4 in block 1. According to the example, the scaling factor identifier 706 identifies a scaling factor (i.e., s) of 3 for sample 1, of 1 for sample 2, of 2 for sample 3, and of 4 for sample 4. The scaling factor identifier 706 also determines that the scaling factor s of 1 (for sample 2) is a unique minimum scaling factor s among the samples in block 1. To determine whether a unique minimum scaling factor s exists in any given block, the scaling factor identifier 706 may sort the scaling factors of all samples in the block, for example.

The scaling factor identifier 706 then provides the scaling factors s to the block scaler 702 and the quantizer 704. In one embodiment, the scaling factor identifier 706 may provide each scaling factor s of the samples in a block to the block scaler 702 and the quantizer 704. In another embodiment, the scaling factor identifier 706 may provide one scaling factor s (i.e., a block scaling factor s), which is representative of the maximum number of redundant sign bits that can be scaled or trimmed from the block without negatively affecting the fixed-point precision in the block, to the block scaler 702 and the quantizer 704.

Further, if a unique minimum scaling factor for a certain sample exists among the samples in the block, the scaling factor identifier 706 provides a position p of the certain sample to the block scaler 702 and the quantizer 704. With reference to the scaling factors s and the position p, the block scaler 702 scales sign extension bits from samples in the block to provide a set of scaled samples. Further, with reference to the scaling factors s and the position p, the quantizer 704 quantizes the set of scaled samples in the block to provide a set of quantized samples.

For example context, Table 3 below includes representative decimated samples $sig_{ds}$, scaled or trimmed sign extension bits, and quantized bits $sig_q$ of decimated samples. Comparing block 1 between Table 2 and Table 3, an additional significant bit of information is included in the quantized bits $sig_q$ for block 1 in Table 3, as the number of scaled or trimmed sign extension bits for the block is increased to 2 from 1.

TABLE 3

| Block | Sample | sig$_{ds}$ <Measured> | sig$_{ds}$ <Converted -15 bits> | s | sig$_q$ <6 bits> |
|---|---|---|---|---|---|
| 1 | 1 | 0.09710693359375 | [11]{110011}1001001 | 2 | 110100 |
|   | 2 | 0.27215576171875 | [0]{0}(1){00010}1101011 | 1 | 000011 |
|   | 3 | 0.12817382812500 | [00]{010000}0110100 | 2 | 010000 |
|   | 4 | 0.06066894531250 | [11]{111000}0011110 | 2 | 111000 |
| 2 | 5 | 0.05822753906250 | [000]{001110}111010 | 3 | 001111 |
|   | 6 | 0.00012207031250 | [000]{000000}000010 | 3 | 000000 |
|   | 7 | 0.07214355468750 | [000]{010010}011110 | 3 | 010010 |
|   | 8 | 0.08251953125000 | [111]{101010}111000 | 3 | 101011 |
| 3 | ... | ... | ... | ... | ... |
| 4 | ... | ... | ... | ... | ... |
| ... | ... | ... | ... | ... | ... |

For block 1 in Table 3, which includes a unique minimum number of sign extension bits which may be trimmed from sample 2, the block scaler 702 scales 2 sign extension bits from samples 1, 3, and 4, and trims 1 sign extension bit from sample 1. In contrast to Table 2 above, where only 1 sign extension bit could be scaled from each of the samples in block 1 without negatively affecting the fixed-point precision for the block, an additional redundant sign extension bit is scaled from samples 1, 3, and 4, increasing the precision for those samples. Further, an additional bit is scaled and/or quantized for sample 2, using implicity, which increases the precision for sample 2.

To implicitly capture an additional bit for sample 2, the quantizer 704 selects the MSB bits "000010" (rounded to "000011") (in curly brackets) rather than "010010", as was the case in Table 2. In Table 3, the quantizer 704 has omitted the leading bit (in parenthesis) of sample 2, because sample 2 is known to have a unique minimum number of sign extension bits for block 1. This omission is encoded in the state value of the code word s$_{cw}$, as further described below. At the side of the decoder, the decoder may identify that sample 2 was encoded using implicity by decoding the code word s$_{cw}$.

Figure 6B:
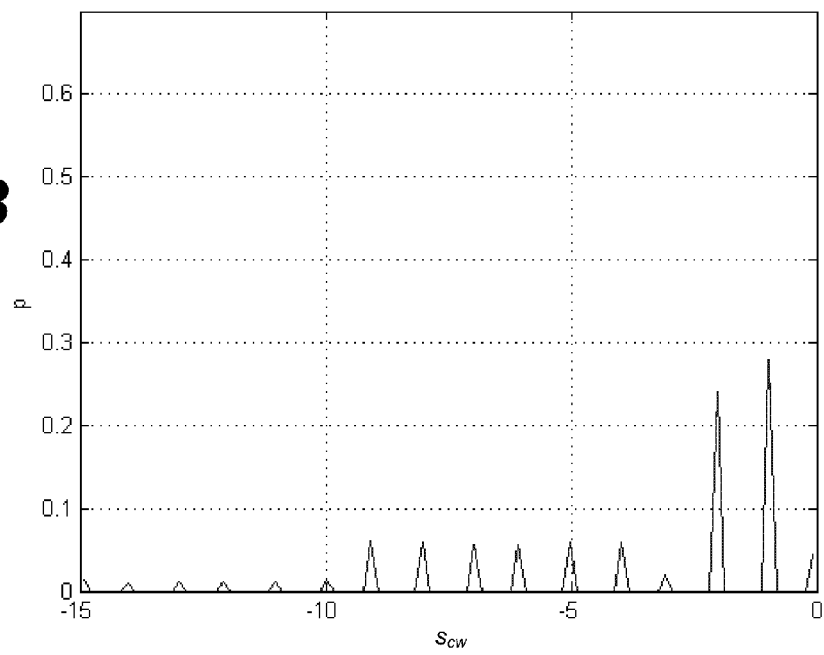
FIG. 6B illustrates a probability distribution of various states of a sign extension code word used for implicit quantization in the communications system of FIG. 1 according to an example embodiment.

To illustrate the difference in the distribution of the probability of the state values of the scaling factor s and the code word s$_{cw}$ (e.g., between explicit and implicit quantization), FIG. 6A may be compared with FIG. 6B. FIG. 6B illustrates a distribution of the probability of states of a sign extension or scaling code word s$_{cw}$ used for implicit quantization. As illustrated in FIG. 6B, the states (especially, for example, states 5-15) of the code word s$_{cw}$ are better used in implicit quantization than those of the scaling factor s used in explicit quantization.

As another example, for implicit Qq-MSB quantization of blocks of Ns=6 samples, the block scaler 702 may scale redundant sign extension bits as provided below in Table 4. It is noted that, in Table 4, examples are provided for positive samples only. For states 4-15, the block scaler 702 scales an additional bit from each sample in the block than would be possible without the use of implicity. To achieve this, one additional leading MSB is scaled from the sample having the unique minimum number of redundant sign extension bits.

TABLE 4

| Block s-factor, Per Sample | s$_{cw}$ State | sig | sig$_{bs}$ |
|---|---|---|---|
| s = [0, 0, 0, 0, 0, 0] | 0 | 0xx xxxx xxxx xxxx | 0xx xxxx xxxx xxxx |
| s = [1, 1, 1, 1, 1, 1] | 1 | 00x xxxx xxxx xxxx | 0x xxxx xxxx xxxx |
| s = [2, 2, 2, 2, 2, 2] | 2 | 000 xxxx xxxx xxxx | 0 xxxx xxxx xxxx |
| s = [3, 3, 3, 3, 3, 3] | 3 | 000 0xxx xxxx xxxx | 0xxx xxxx xxxx |
| s = [1, 2, 2, 2, 2, 2] | 4 | 001 xxxx xxxx xxxx; s(1) = 1 | 0 xxxx xxxx xxxx |
|  |  | 000 xxxx xxxx xxxx; s(n ≠ 1) = 2 | 0 xxxx xxxx xxxx |
| s = [2, 1, 2, 2, 2, 2] | 5 | 001 xxxx xxxx xxxx; s(2) = 1 | 0 xxxx xxxx xxxx |
|  |  | 000 xxxx xxxx xxxx; s(n ≠ 2) = 2 | 0 xxxx xxxx xxxx |
| s = [2, 2, 1, 2, 2, 2] | 6 | 001 xxxx xxxx xxxx; s(3) = 1 | 0 xxxx xxxx xxxx |
|  |  | 000 xxxx xxxx xxxx; s(n ≠ 3) = 2 | 0 xxxx xxxx xxxx |
| s = [2, 2, 2, 1, 2, 2] | 7 | 001 xxxx xxxx xxxx; s(4) = 1 | 0 xxxx xxxx xxxx |
|  |  | 000 xxxx xxxx xxxx; s(n ≠ 4) = 2 | 0 xxxx xxxx xxxx |
| s = [2, 2, 2, 2, 1, 2] | 8 | 001 xxxx xxxx xxxx; s(5) = 1 | 0 xxxx xxxx xxxx |
|  |  | 000 xxxx xxxx xxxx; s(n ≠ 5) = 2 | 0 xxxx xxxx xxxx |
| s = [2, 2, 2, 2, 2, 1] | 9 | 001 xxxx xxxx xxxx; s(6) = 1 | 0 xxxx xxxx xxxx |
|  |  | 000 xxxx xxxx xxxx; s(n ≠ 6) = 2 | 0 xxxx xxxx xxxx |
| s = [2, 3, 3, 3, 3, 3] | 10 | 000 1xxx xxxx xxxx; s(1) = 2 | 0 xxx xxxx xxxx |
|  |  | 000 0xxx xxxx xxxx; s(n ≠ 1) = 3 | 0xxx xxxx xxxx |
| s = [3, 2, 3, 3, 3, 3] | 11 | 000 1xxx xxxx xxxx; s(2) = 2 | 0 xxx xxxx xxxx |
|  |  | 000 0xxx xxxx xxxx; s(n ≠ 1) = 3 | 0xxx xxxx xxxx |
| s = [3, 3, 2, 3, 3, 3] | 12 | 000 1xxx xxxx xxxx; s(3) = 2 | 0 xxx xxxx xxxx |
|  |  | 000 0xxx xxxx xxxx; s(n ≠ 3) = 3 | 0xxx xxxx xxxx |
| s = [3, 3, 3, 2, 3, 3] | 13 | 000 1xxx xxxx xxxx; s(4) = 2 | 0 xxx xxxx xxxx |
|  |  | 000 0xxx xxxx xxxx; s(n ≠ 4) = 3 | 0xxx xxxx xxxx |
| s = [3, 3, 3, 3, 2, 3] | 14 | 000 1xxx xxxx xxxx; s(5) = 2 | 0 xxx xxxx xxxx |
|  |  | 000 0xxx xxxx xxxx; s(n ≠ 5) = 3 | 0xxx xxxx xxxx |
| s = [3, 3, 3, 3, 3, 2] | 15 | 000 1xxx xxxx xxxx; s(6) = 2 | 0 xxx xxxx xxxx |
|  |  | 000 0xxx xxxx xxxx; s(n ≠ 6) = 3 | 0xxx xxxx xxxx |

One example of a code word table used by the quantizer 704 for implicit Qq-MSB quantization of blocks of Ns=6 samples is provided below in Table 5. For entries from 4 to 15, the entries implicitly contain one additional MSB of quantized data than would be possible without the use of implicity. Thus, the use of implicit Qq-MSB quantization in the encoder 700 tends to improve signal quality (i.e., provides lower quantization error) as compared to the use of explicit Qq-MSB quantization.

TABLE 5

| Scaled Bits Per Sample | $s_{cw}$ State | Description |
|---|---|---|
| [0, 0, 0, 0, 0, 0] | 0 | No unique minimum in block, 0 bits scaled. |
| [1, 1, 1, 1, 1, 1] | 1 | No unique minimum in block, 1 bits scaled. |
| [2, 2, 2, 2, 2, 2] | 2 | No unique minimum in block, 2 bits scaled. |
| [3, 3, 3, 3, 3, 3] | 3 | No unique minimum in block, 3 bits scaled. |
| [1, 2, 2, 2, 2, 2] | 4 | One unique minimum in block at the $1^{st}$ position, 2 bits scaled for each sample. |
| [2, 1, 2, 2, 2, 2] | 5 | One unique minimum in block at the $2^{nd}$ position, 2 bits scaled for each sample. |
| [2, 2, 1, 2, 2, 2] | 6 | One unique minimum in block at the $3^{rd}$ position, 2 bits scaled for each sample. |
| [2, 2, 2, 1, 2, 2] | 7 | One unique minimum in block at the $4^{th}$ position, 2 bits scaled for each sample. |
| [2, 2, 2, 2, 1, 2] | 8 | One unique minimum in block at the $5^{th}$ position, 2 bits scaled for each sample. |
| [2, 2, 2, 2, 2, 1] | 9 | One unique minimum in block at the $6^{th}$ position, 2 bits scaled for each sample. |
| [2, 3, 3, 3, 3, 3] | 10 | One unique minimum in block at the $1^{st}$ position, 3 bits scaled for each sample. |
| [3, 2, 3, 3, 3, 3] | 11 | One unique minimum in block at the $2^{nd}$ position, 3 bits scaled for each sample. |
| [3, 3, 2, 3, 3, 3] | 12 | One unique minimum in block at the $3^{rd}$ position, 3 bits scaled for each sample. |
| [3, 3, 3, 2, 3, 3] | 13 | One unique minimum in block at the $4^{th}$ position, 3 bits scaled for each sample. |
| [3, 3, 3, 3, 2, 3] | 14 | One unique minimum in block at the $5^{th}$ position, 3 bits scaled for each sample. |
| [3, 3, 3, 3, 3, 2] | 15 | One unique minimum in block at the $6^{th}$ position, 3 bits scaled for each sample. |

As illustrated in FIG. 7, the block scaling s and position p factors are provided to the code word generator 708. The code word generator 708 encodes a scaling code word $s_{cw}$ for the block. The scaling code word $s_{cw}$ is generated based on the block scaling factor s, which identifies a number of sign extension bits scaled from the samples in the block, and the position factor p, which identifies whether and where a sample having a unique minimum scaling factor exists in the block. In one embodiment, for Ns=6, the code word $s_{cw}$ may be embodied as 4 Qs bits, and the code word generator 708 may encode the code word $s_{cw}$ to be representative of one of the 16 states from Tables 4 or 5, for example, depending upon the values of s and p.

The framer 710 receives a block of quantized samples $siq_q$ from the quantizer 704 and the scaling code word $s_{cw}$ from the code word generator 708, and frames the block and the scaling code word $s_{cw}$ into a frame. In various embodiments, the framer 710 may receive several blocks of quantized samples from the quantizer 704 and several scaling code words $s_{cw}$ from the code word generator 708, and arrange or frame them into one or more frames, packets, or any other suitable package for data communications over the transport channel 150 (FIG. 2), for example.

Figure 8:
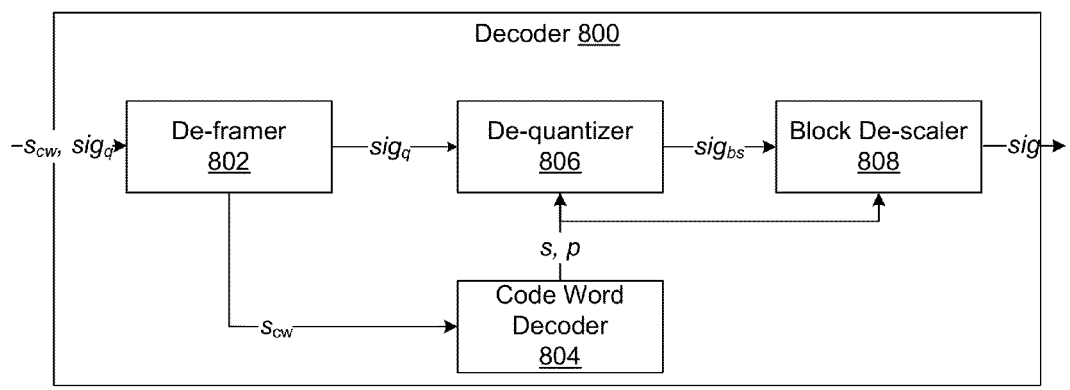
FIG. 8 illustrates an example decoder using implicity in the communications system of FIG. 2 according to an example embodiment.

FIG. 8 illustrates an example decoder 800 using implicity in the communications system of FIG. 2 according to an example embodiment. In one embodiment, the decoder 800 may be relied upon in place of the decoder 230 in FIG. 2. The decoder 800 includes a de-framer 802, a code word decoder 804, a de-quantizer 806, and a block de-scaler 808. Generally, the decoder 800 works to reverse the order of operation of the encoder 700, and the elements of the decoder 800 may be embodied as one or more general- or specific-purpose processors or processing circuits.

The de-framer 802 extracts a sequence of quantized samples $sig_q$ in a block and a code word $s_{cw}$ from a received frame or packet, and provides them to the de-quantizer 806 and the code word decoder 804, respectively. In turn, the code word decoder 804 decodes the scaling code word $s_{cw}$ into scaling s and position p factors, and provides the s and p factors to the de-quantizer 806 and the block de-scaler 808. The de-quantizer 806 de-quantizes the sequence of samples $sig_q$ in the block based on the s and p factors, which identify whether an implicitly encoded bit exists in the block. After de-quantization, the block de-scaler 808 de-scales the sequence of de-quantized samples $sig_{bs}$ based on the s and p factors.

For implicit Qq-MSB quantization of blocks of Ns=6 samples, the de-quantizer 806 and the block de-scaler 808 may de-quantize and de-scale samples according to Table 6. In Table 6, examples are provided for positive samples only. Generally, de-quantized bits from received samples may be populated in place of the "x" placeholders in Table 6, depending upon the scaling s and position p factors, and whether an implicitly encoded bit exists in a block of received samples.

TABLE 6

| $s_{cw}$ State | $sig_q$ | sig |
|---|---|---|
| 0 | 0xxxxx | 0xx xxx0 0000 0000 |
| 1 | 0xxxxx | 00x xxxx 0000 0000 |
| 2 | 0xxxxx | 000 xxxx x000 0000 |
| 3 | 0xxxxx | 000 0xxx xx00 0000 |
| 4 | 0xxxxx; s(1) = 1 | 001 xxxx x000 0000 |
|   | 0xxxxx; s(n ≠ 1) = 2 | 000 xxxx x000 0000 |
| 5 | 0xxxxx; s(2) = 2 | 001 xxxx x000 0000 |
|   | 0xxxxx; s(n ≠ 2) = 2 | 000 xxxx x000 0000 |
| 6 | 0xxxxx; s(3) = 1 | 001 xxxx x000 0000 |
|   | 0xxxxx; s(n ≠ 3) = 2 | 000 xxxx x000 0000 |
| 7 | 0xxxxx; s(4) = 1 | 001 xxxx x000 0000 |
|   | 0xxxxx; s(n ≠ 4) = 2 | 000 xxxx x000 0000 |
| 8 | 0xxxxx; s(5) = 1 | 001 xxxx x000 0000 |
|   | 0xxxxx; s(n ≠ 5) = 2 | 000 xxxx x000 0000 |
| 9 | 0xxxxx; s(6) = 1 | 001 xxxx x000 0000 |
|   | 0xxxxx; s(n ≠ 6) = 2 | 000 xxxx x000 0000 |
| 10 | 0xxxxx; s(1) = 2 | 000 1xxx xx00 0000 |
|   | 0xxxxx; s(n ≠ 1) = 3 | 000 0xxx xx00 0000 |
| 11 | 0xxxxx; s(2) = 2 | 000 1xxx xx00 0000 |
|   | 0xxxxx; s(n ≠ 2) = 3 | 000 0xxx xx00 0000 |
| 12 | 0xxxxx; s(3) = 2 | 000 1xxx xx00 0000 |
|   | 0xxxxx; s(n ≠ 3) = 3 | 000 0xxx xx00 0000 |
| 13 | 0xxxxx; s(4) = 2 | 000 1xxx xx00 0000 |
|   | 0xxxxx; s(n ≠ 4) = 3 | 000 0xxx xx00 0000 |
| 14 | 0xxxxx; s(5) = 2 | 000 1xxx xx00 0000 |
|   | 0xxxxx; s(n ≠ 5) = 3 | 000 0xxx xx00 0000 |
| 15 | 0xxxxx; s(6) = 2 | 000 1xxx xx00 0000 |
|   | 0xxxxx; s(n ≠ 6) = 3 | 000 0xxx xx00 0000 |

At least in certain aspects, implicit Qq-MSB quantization and de-quantization using the encoder 700 and the decoder 800 tends to improve signal quality (e.g., provides lower quantization error) as compared to the use of, for example, explicit Qq-MSB quantization.

D.4 Explicit Variable-MSB Inter Block Adaptive Quantization

Due to the change in the number of redundant sign extension bits which are removed from respective, sequential blocks, the noise floor of samples varies between blocks. That is, blocks with smaller scaling factors (i.e., fewer trimmed bits) result in larger quantization error as compared to blocks with larger scaling factors. For example, if no bits are scaled from block n and two bits are scaled from block n+1, then 6-bit quantization would result in bits [15:10] being output for the samples of block n and bits [13:8] being output for the samples of block n+1, respectively. In this sense, the noise floor for block n+1 is improved as compared to block n. In this context, to smooth the noise floor among blocks and improve the overall performance of the system 10, inter-block adaptive quantization is relied upon in certain embodiments.

According to aspects of inter-block adaptive quantization described herein, a set of blocks is grouped into a macro-block, and quantization bits are variably allocated among the blocks in the macro-block. In this way, a near constant noise floor may be maintained within a macro-block. Blocks may be grouped into macro-blocks in time (e.g., block(t), block (t+1), block(t+n), etc.), the complex domain (block_I(t), block_Q(t)), etc.), the spatial domain (block_sig1(t), block_sig2(t), . . . block_sig(n)(t), etc.), or any combination thereof, for example, without limitation. Further, any suitable number of blocks, such as 2-6 blocks, for example, may be grouped into a macro-block.

In one embodiment, spatial domain grouping and aggregation may be applicable for data bundles among different carriers, to achieve a substantially flat noise floor for a compressed sequence of samples. For example, using a macro-block size of two blocks for complex domain variable-MSB inter-block adaptive quantization may improve EVM performance as compared to explicit encoding using a block size of Ns=3 samples and as compared to implicit encoding using a block size of Ns=6 samples.

Figure 9:
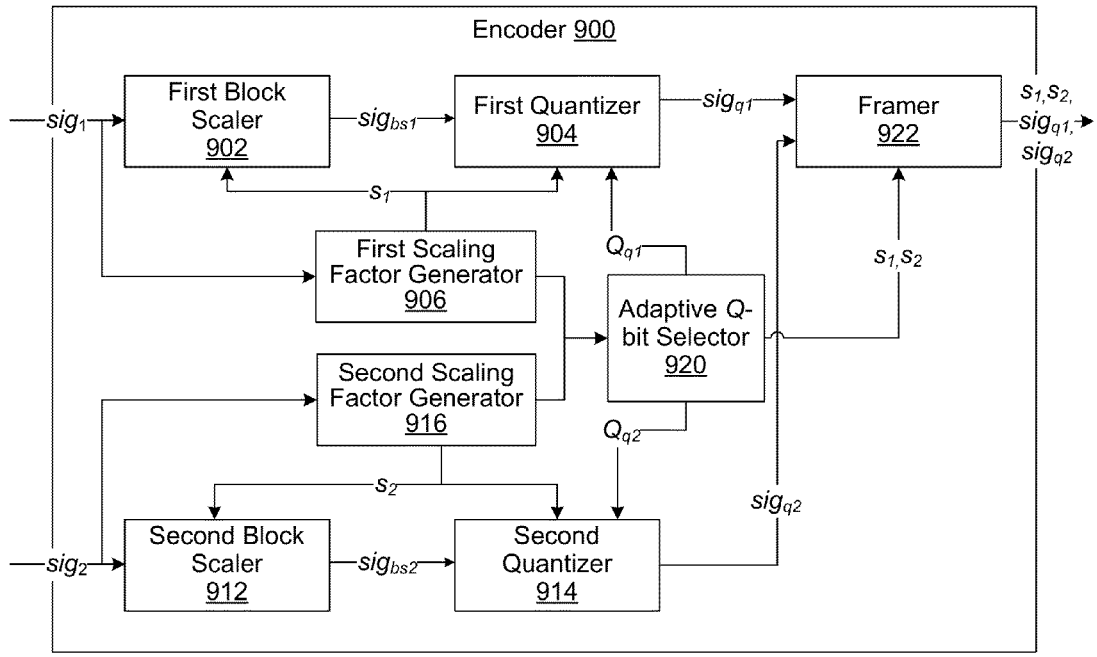
FIG. 9 illustrates an example encoder using inter-block adaptive quantization in the communications system of FIG. 2 according to an example embodiment.

FIG. 9 illustrates an example encoder 900 using inter-block adaptive quantization in the communications system of FIG. 2 according to an example embodiment. In one embodiment, the encoder 900 may be relied upon in place of the encoder 220 in FIG. 2. The encoder 900 includes a first block scaler 902, a first quantizer 904, a first scaling factor generator 906, a second block scaler 912, a second quantizer 914, a second scaling factor generator 916, an adaptive Q-bit selector 920, and a framer 922. According to the example described below, the encoder 900 operates using pairs of blocks, each having Ns=3 samples. Although the encoder 900 in FIG. 9 operates with a pair of blocks in a macro-block, it should be appreciated that the encoder 900 may be scaled to operate on 3, 4, 5, 6, or more blocks in a macro-block. In this case, the encoder 900 may include a block scaler and a quantizer for each block in the macro-block. Generally, the elements of the encoder 900 may be embodied as one or more general- or specific-purpose processors or processing circuits. The encoder 900 also operates using 2 Qs bits for the s factor of each block in the pair, and a variable number of Qq bits for quantizing the samples in each block of the pair. It should be appreciated, however, that the use of other numbers of Ns samples, Qs bits, and Qq bits are within the scope and spirit of the embodiments described herein.

The encoder 900 receives a first sequence of samples $sig_1$ organized into first samples of a first block and a second sequence of samples $sig_2$ organized into second samples of a second block. As described above, the first and second sequences of samples $sig_1$ and $sig_2$ may be organized in time (e.g., block(t), block(t+1), block(t+n), etc.), the complex domain (block_I(t), block_Q(t)), etc.), the spatial domain (block_sig1(t), block_sig2(t), . . . block_sig(n)(t), etc.), etc. Preferably, the samples are organized to smooth the noise floor among blocks and improve the overall performance of the system 10.

The first block scaler 902 and the first quantizer 904 operate in a manner which is similar to the block scaler 222 and the quantizer 224 in the encoder 220 of FIG. 2. Also, the second block scaler 912 and the second quantizer 914 operate in a manner which is similar to the block scaler 222 and the quantizer 224 in the encoder 220 of FIG. 2. The first scaling factor generator 906 determines a first scaling factor $s_1$ for the first block of the first sequence of samples $sig_1$, based on the number of redundant sign extension bits of the first samples. Here, the scaling factor $s_1$ is an indicator of the maximum number of redundant sign extension bits that can be scaled or trimmed from the first block without negatively affecting the fixed-point precision of the first samples.

The second scaling factor generator 916 determines a second scaling factor $s_2$ for the second block of the second sequence of samples $sig_2$, based on the number of redundant sign extension bits of the second samples. Here, the scaling factor $s_2$ is an indicator of the maximum number of redundant sign bits that can be scaled or trimmed from the second block without negatively affecting the fixed-point precision of the second samples.

Based on the first and second scaling factors $s_1$ and $s_2$, the first block scaler 902 and the second block scaler 912, respectively, may scale redundant sign extension bits from the first block and the second block, as provided below in Table 7. In Table 7, examples are provided for positive samples only.

TABLE 7

| Block s Factor | State | sig | $sig_{bs}$ |
|---|---|---|---|
| s = [0, 0, 0] | 0 | 0xx xxxx xxxx xxxx | 0xx xxxx xxxx xxxx |
| s = [1, 1, 1] | 1 | 00x xxxx xxxx xxxx | 0x xxxx xxxx xxxx |
| s = [2, 2, 2] | 2 | 000 xxxx xxxx xxxx | 0 xxxx xxxx xxxx |
| s = [3, 3, 3] | 3 | 000 0xxx xxxx xxxx | 0xxx xxxx xxxx |

Further, based on the first and second scaling factors $s_1$ and $s_2$, the adaptive Q-bit selector 920 determines a first number of quantization bits $Q_{q1}$ for quantizing the first samples in the first block and a second number of quantization bits $Q_{q2}$ for quantizing the second samples in the second block. Particularly, to help balance any difference in the noise floor among the first and second blocks, which is a factor of the scaling factors $s_1$ and $s_2$, the Q-bit selector 920 determines the first and second quantization bits $Q_{q1}$ and $Q_{q2}$ based on the first and second scaling factors $s_1$ and $s_2$. Particularly, it is noted that, for a scaling factor of 3, for example, the noise floor is lower than for a scaling factor of 0 or 1. That is, when a greater number of redundant sign extension bits are scaled or trimmed for a block, quantization error is relatively lower for the block, because more of the significant bits of the samples in the block are captured during quantization.

Thus, in one embodiment, the adaptive Q-bit selector 920 provisions more quantization bits to block having relatively lower scaling factors, and provisions less quantization bits to blocks having relatively higher scaling factors. It is noted, however, that the balance of quantization bits Qq for the macro-block, which includes the pair of blocks, is maintained. That is, for one pair of blocks in a macro-block, 12 quantization bits may be shared among the pair of blocks, for example. Thus, if one additional Qq bit is provided to the first block, then the second block is left with one fewer Qq bit. In embodiments where a macro-block includes more than a pair of blocks, the adaptive Q-bit selector 920 may seek to balance any difference in the noise floor among the blocks in the macro-block. In this case, the adaptive Q-bit selector 920 may provision more quantization bits to blocks having relatively lower scaling factors, while maintaining an overall number of quantization bits for the macro block.

The adaptive Q-bit selector 920 may rely upon Tables 8 and 9 below, which respectively return values for $Q_{q1}$ and $Q_{q2}$ based on the first and second scaling factors $s_1$ and $s_2$.

TABLE 8

| $Q_{q1}$-bits | S1 = 0 | S1 = 1 | S1 = 2 | S1 = 3 |
|---|---|---|---|---|
| S2 = 0 | 6 | 6 | 5 | 5 |
| S2 = 1 | 6 | 6 | 6 | 5 |
| S2 = 2 | 7 | 6 | 6 | 6 |
| S2 = 3 | 7 | 7 | 6 | 6 |

TABLE 9

| $Q_{q2}$-bits | S1 = 0 | S1 = 1 | S1 = 2 | S1 = 3 |
|---|---|---|---|---|
| S2 = 0 | 6 | 6 | 7 | 7 |
| S2 = 1 | 6 | 6 | 6 | 7 |
| S2 = 2 | 5 | 6 | 6 | 6 |
| S2 = 3 | 5 | 5 | 6 | 6 |

The framer 922 operates in a manner which is similar to the framer 710 in the encoder 700 of FIG. 7. The framer 922 receives a first block of quantized samples $siq_{q1}$ from the first quantizer 904, a second block of quantized samples $siq_{q2}$ from the second quantizer 914, and the first and second scaling factors $s_1$ and $s_2$, and frames the first and second blocks and the scaling factors $s_1$ and $s_2$ into a frame. In various embodiments, the framer 922 may arrange or frame several blocks and scaling factors into one or more frames, packets, or any other suitable package for data communications over the transport channel 150 (FIG. 2), for example.

Figure 10:
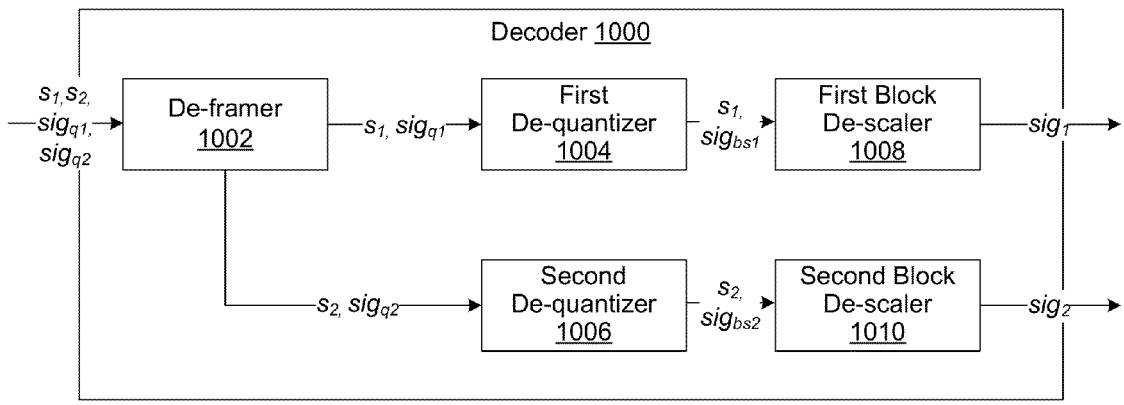
FIG. 10 illustrates an example decoder using inter-block adaptive quantization in the communications system of FIG. 2 according to an example embodiment.

FIG. 10 illustrates an example decoder 1000 using inter-block adaptive quantization in the communications system of FIG. 2 according to an example embodiment. In one embodiment, the decoder 1000 may be relied upon in place of the decoder 230 in FIG. 2. The decoder 1000 includes a de-framer 1002, a first de-quantizer 1004, a second de-quantizer 1006, a first block de-scaler 1008, and a second block de-scaler 1010. Generally, the decoder 1000 works to reverse the order of operation of the encoder 900, and the elements of the decoder 1000 may be embodied as one or more general- or specific-purpose processors or processing circuits. According to the example described below, the decoder 1000 operates using pairs of blocks. Although the decoder 1000 in FIG. 10 operates with a pair of blocks in a macro-block, it should be appreciated that the decoder 1000 may be scaled to operate on 3, 4, 5, 6, or more blocks in a macro-block. In this case, the decoder 1000 may include a block de-scaler and a de-quantizer for each block in the macro-block.

The de-framer 1002 extracts the first and second blocks including the sequences of quantized samples $siq_{q1}$ and $siq_{q2}$ and the first and second scaling factors $s_1$ and $s_2$ from received frames or packets. The de-framer 1002 provides the first block and the first and second scaling factors $s_1$ and $s_2$ to the first de-quantizer 1004, and provides the second block and the first and second scaling factors $s_1$ and $s_2$ to the second de-quantizer 1006. In turn, the first de-quantizer 1004 de-quantizes the samples in the first block based on the scaling factors $s_1$ and $s_2$, and the second de-quantizer 1006 de-quantizes the samples in the second block based on the second scaling factors $s_1$ and $s_2$. It is noted here that the first and second de-quantizers 1004 and 1006 may identify the number of quantized bits for any given block according to the scaling factors $s_1$ and $s_2$ for a pair of blocks, in a reverse table lookup, with reference to Tables 8 and 9 above, for example. In other words, the first and second de-quantizers 1004 and 1006 identify and account for the balancing of quantization bits among a pair of blocks.

Further, after de-quantization, the first block de-scaler 1008 de-scales the sequence of de-quantized first samples $sig_{bs1}$ in the first block based on the first scaling factor $s_1$, and the second block de-scaler 1010 de-scales the sequence of de-quantized second samples $sig_{bs2}$ in the second block based on the second scaling factor $s_2$.

At least in certain aspects, variable-MSB inter block adaptive quantization and de-quantization using the encoder 900 and the decoder 1000 tends to improve signal quality (e.g., provides lower quantization error) as compared to the use of, for example, implicit or explicit 6-MSB quantization.

D.5 M-D Implicit Adaptive Quantization

Multi-Dimensional (M-D) implicit adaptive quantization builds upon the benefits of implicity and adaptive quantization. To at least some extent, the efficiency of M-D implicit adaptive quantization increases with block size, at the cost of processing overhead and complexity. Pursuant to one example described herein, a block size of Ns=3 samples was selected to balance complexity while achieving good performance. Generally, M-D implicit adaptive quantization relies on a single scaling code word $s_{cw}$ to be representative of scaling factors for respective samples in a block and to identify implicitly encoded bits among samples in a block. The scaling code word $s_{cw}$ may vary in length and, in certain aspects, may be tailored for performance.

Assuming a Gaussian distribution of samples and lack of correlation between the samples, M-D implicit adaptive quantization builds a distribution of probability for scaling factors of respective samples in a block. For a block of Ns=3 samples, where $s_1$, $s_2$, and $s_3$ are the respective scaling factors of the 3 samples in the block, and $P(s_1)$, $P(s_2)$, and $P(s_3)$ are the probabilities of the respective scaling factors, the probability triplet $P_{123}$ for the block is equivalent to $P(s_1)*P(s_2)*P(s_3)$.

If a set of values for the scaling factors $s_1$, $s_2$, and $s_3$ are limited to the range of 0-3, where a value of 3 is representative of all scaling factors of 3 or larger, the scaling factors of 0, 1, and 2 are represented unambiguously. Thus, an implicit bit may be applied to samples with scaling factors of 0, 1, and 2, yielding an additional bit of precision. For 3 samples in a block, each being associated with a scaling factor defined to 4 states, a probability matrix may be defined for $4^3$ or 64 states.

According to certain aspects, a probability matrix of the probability triplet $P_{123}$ is derived, and a variable length prefix code (VLC) set is determined based on the probability matrix. For example, a Huffman code set is an example of a VLC set with good efficiency. It is noted that building a VLC code set for $s_1$, $s_2$, and $s_3$ scaling factor triplets may be more efficient than coding individual scaling factors.

Figure 11:
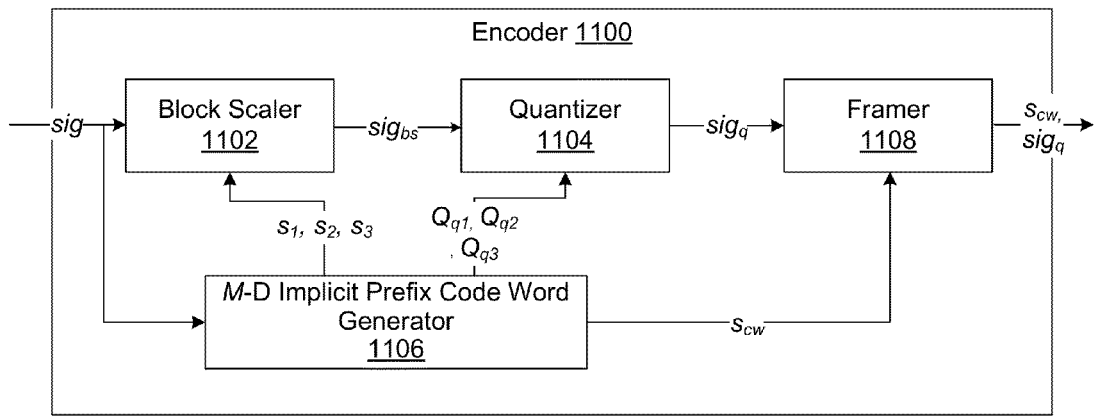
FIG. 11 illustrates an example encoder using multi-dimensional implicit adaptive quantization in the communications system of FIG. 2 according to an example embodiment.

FIG. 11 illustrates an example encoder 1100 using multi-dimensional implicit adaptive quantization in the communications system of FIG. 2 according to an example embodiment. In one embodiment, the encoder 900 may be relied upon in place of the encoder 220 in FIG. 2. The encoder 1100 includes a block scaler 1102, a quantizer 1104, an M-D implicit prefix code word generator 1106, and a framer 1108. Generally, the elements of the encoder 1100 may be embodied as one or more general- or specific-purpose processors or processing circuits.

According to the example described below, the encoder 1100 operates on blocks having Ns=3 samples and a total of 20 bits. The encoder 1100 also operates using a variable number of Qs bits for the scaling code word $s_{cw}$, which is representative of scaling factors for respective samples in the block and identifies which samples in the block have implicitly encoded bits. Generally, the number of Qs bits is driven based on the VLC code set for the $s_1$, $s_2$, and $s_3$ scaling factor triplets, as outlined below. Based on the number of Qs bits of the scaling code word $s_{cw}$, the encoder 1100 determines or spreads the remaining bits of the block as quantization Qq bits among the samples of the block. It should be appreciated, however, that alternative applications of or constraints on the number of Ns samples, Qs bits, and Qq bits are within the scope and spirit of the embodiments described herein.

The M-D implicit prefix code word generator 1106 receives a sequence of samples sig in a block, and determines scaling factors for each of the samples in the block. Particularly, the M-D implicit prefix code word generator 1106 determines an $s_1$, $s_2$, $s_3$ scaling factor triplet for the block, according to the scaling factors of each of the samples of the block. In turn, the M-D implicit prefix code word generator 1106 identifies a VLC code word $s_{cw}$ word based on the scaling factor triplet, and identifies a number of quantization bits $Q_{q1}$, $Q_{q2}$, and $Q_{q3}$ for each sample in the block. The number of quantization bits $Q_{q1}$, $Q_{q2}$, and $Q_{q3}$ are selected by spreading the remaining bits of the block to achieve a near-equal noise floor for the samples. In other words, for example, if the M-D implicit prefix code word generator 1106 identifies or returns, based on the scaling factor triplet, a code word $s_{cw}$ of 6 bits, 14 bits are remaining in the block for quantization of the 3 samples of the block, and the M-D implicit prefix code word generator 1106 spreads or apportions those 14 bits among the quantization bits $Q_{q1}$, $Q_{q2}$, and $Q_{q3}$ to achieve a near-equal noise floor among the samples.

As one example of a code word table which may be relied upon by the M-D implicit prefix code word generator 1106, Table 10 below lists code words $s_{cw}$, associated $s_1$, $s_2$, and $s_3$ scaling factor triplets, and the probabilities of the scaling factor triplets. Table 10 may be considered an M-dimensional table which has been flattened. In other words, the state values of the code words $s_{cw}$ in Table 10, which are listed in the column at the far left, may be decoded based on an evaluation of the expression $s_1+(s_2*4)+(s_3*16)+1$.

TABLE 10

| $s_1+(s_2*4)+(s_3*16)+1$ | $Q_{q1}$ | $Q_{q2}$ | $Q_{q3}$ | $s_1$ | $s_2$ | $s_3$ | $P_{123}$ | $s_{cw}$ |
|---|---|---|---|---|---|---|---|---|
| 1 | 5 | 4 | 4 | 0 | 0 | 0 | 0.057% | [1, 1, 0, 1, 1, 1, 0, 1, 0, 0] |
| 2 | 4 | 5 | 4 | 1 | 0 | 0 | 0.057% | [1, 1, 0, 1, 1, 0, 1, 1, 0, 1] |
| 3 | 3 | 5 | 5 | 2 | 0 | 0 | 0.057% | [1, 1, 0, 1, 1, 0, 1, 1, 0, 0] |
| 4 | 2 | 5 | 5 | 3 | 0 | 0 | 0.057% | [1, 1, 0, 1, 1, 0, 1, 1, 1, 1] |
| 5 | 5 | 4 | 4 | 0 | 1 | 0 | 0.057% | [1, 1, 0, 1, 1, 0, 1, 1, 1, 0] |
| 6 | 5 | 4 | 5 | 1 | 1 | 0 | 0.205% | [1, 1, 0, 0, 1, 0, 0, 0, 1] |
| 7 | 4 | 5 | 5 | 2 | 1 | 0 | 0.148% | [1, 1, 0, 1, 0, 1, 0, 1, 0] |
| 8 | 4 | 5 | 6 | 3 | 1 | 0 | 0.459% | [1, 1, 0, 1, 1, 0, 0] |
| 9 | 5 | 3 | 5 | 0 | 2 | 0 | 0.057% | [1, 1, 0, 1, 1, 0, 1, 0, 0, 1] |
| 10 | 5 | 4 | 5 | 1 | 2 | 0 | 0.149% | [1, 1, 0, 0, 1, 1, 1, 1, 1] |
| 11 | 4 | 4 | 6 | 2 | 2 | 0 | 0.110% | [1, 1, 0, 1, 1, 1, 0, 1, 1] |
| 12 | 4 | 4 | 6 | 3 | 2 | 0 | 0.242% | [1, 1, 0, 1, 0, 1, 1, 0] |
| 13 | 5 | 2 | 5 | 0 | 3 | 0 | 0.057% | [1, 1, 0, 1, 1, 0, 1, 0, 0, 0] |
| 14 | 5 | 3 | 6 | 1 | 3 | 0 | 0.298% | [1, 1, 0, 1, 0, 0, 0, 1] |
| 15 | 4 | 3 | 6 | 2 | 3 | 0 | 0.219% | [1, 1, 0, 0, 1, 0, 0, 0, 0] |
| 16 | 4 | 3 | 6 | 3 | 3 | 0 | 0.297% | [1, 1, 0, 1, 0, 0, 1, 1] |
| 17 | 5 | 5 | 3 | 0 | 0 | 1 | 0.057% | [1, 1, 0, 1, 1, 0, 1, 0, 1, 1] |
| 18 | 5 | 6 | 4 | 1 | 0 | 1 | 0.297% | [1, 1, 0, 1, 0, 0, 1, 0] |
| 19 | 4 | 6 | 4 | 2 | 0 | 1 | 0.150% | [1, 1, 0, 0, 1, 1, 1, 0, 0] |
| 20 | 3 | 6 | 5 | 3 | 0 | 1 | 0.380% | [1, 1, 0, 0, 1, 0, 1, 1] |
| 21 | 6 | 5 | 4 | 0 | 1 | 1 | 0.223% | [1, 1, 0, 1, 1, 1, 0, 0] |
| 22 | 6 | 6 | 6 | 1 | 1 | 1 | 3.262% | [1, 1, 0, 0, 0] |
| 23 | 6 | 6 | 6 | 2 | 1 | 1 | 3.323% | [1, 0, 1, 1, 0] |
| 24 | 5 | 6 | 6 | 3 | 1 | 1 | 3.446% | [0, 1, 1, 1, 0] |
| 25 | 6 | 4 | 4 | 0 | 2 | 1 | 0.149% | [1, 1, 0, 0, 1, 1, 1, 0, 1] |
| 26 | 7 | 5 | 6 | 1 | 2 | 1 | 3.322% | [1, 0, 1, 1, 1] |
| 27 | 6 | 6 | 6 | 2 | 2 | 1 | 3.343% | [1, 0, 0, 0, 1] |
| 28 | 5 | 6 | 6 | 3 | 2 | 1 | 3.457% | [0, 0, 1, 1, 1] |
| 29 | 6 | 3 | 5 | 0 | 3 | 1 | 0.226% | [1, 1, 0, 1, 0, 1, 1, 1] |
| 30 | 7 | 4 | 6 | 1 | 3 | 1 | 3.415% | [1, 0, 0, 0, 0] |
| 31 | 6 | 5 | 6 | 2 | 3 | 1 | 3.450% | [0, 1, 0, 1, 1] |
| 32 | 5 | 5 | 6 | 3 | 3 | 1 | 3.584% | [0, 0, 0, 1, 1] |
| 33 | 5 | 5 | 3 | 0 | 0 | 2 | 0.056% | [1, 1, 0, 1, 1, 1, 0, 1, 0, 1] |
| 34 | 5 | 6 | 3 | 1 | 0 | 2 | 0.149% | [1, 1, 0, 0, 1, 1, 1, 1, 0] |
| 35 | 4 | 6 | 4 | 2 | 0 | 2 | 0.183% | [1, 1, 0, 0, 1, 0, 1, 0, 1] |
| 36 | 3 | 6 | 4 | 3 | 0 | 2 | 0.169% | [1, 1, 0, 0, 1, 1, 0, 1, 0] |
| 37 | 6 | 5 | 3 | 0 | 1 | 2 | 0.159% | [1, 1, 0, 0, 1, 1, 0, 1, 1] |
| 38 | 7 | 6 | 5 | 1 | 1 | 2 | 3.327% | [1, 0, 1, 0, 1] |
| 39 | 6 | 7 | 5 | 2 | 1 | 2 | 3.343% | [1, 0, 0, 1, 1] |
| 40 | 5 | 7 | 5 | 3 | 1 | 2 | 3.448% | [0, 1, 1, 0, 1] |
| 41 | 6 | 4 | 4 | 0 | 2 | 2 | 0.118% | [1, 1, 0, 1, 0, 1, 0, 1, 1] |
| 42 | 7 | 6 | 5 | 1 | 2 | 2 | 3.343% | [1, 0, 0, 0, 1, 0] |
| 43 | 6 | 6 | 6 | 2 | 2 | 2 | 3.329% | [1, 0, 1, 0, 0] |
| 44 | 5 | 6 | 6 | 3 | 2 | 2 | 3.453% | [0, 1, 0, 1, 0] |
| 45 | 6 | 3 | 4 | 0 | 3 | 2 | 0.182% | [1, 1, 0, 0, 1, 1, 0, 0, 0] |
| 46 | 7 | 5 | 5 | 1 | 3 | 2 | 3.448% | [0, 1, 1, 0, 0] |
| 47 | 6 | 5 | 6 | 2 | 3 | 2 | 3.455% | [0, 1, 0, 0, 1] |
| 48 | 5 | 5 | 6 | 3 | 3 | 2 | 3.588% | [0, 0, 0, 1, 0] |
| 49 | 5 | 5 | 2 | 0 | 0 | 3 | 0.057% | [1, 1, 0, 1, 1, 0, 1, 0, 1, 0] |
| 50 | 5 | 6 | 3 | 1 | 0 | 3 | 0.383% | [1, 1, 0, 0, 1, 0, 0, 1] |
| 51 | 4 | 6 | 3 | 2 | 0 | 3 | 0.178% | [1, 1, 0, 0, 1, 1, 0, 0, 1] |
| 52 | 4 | 6 | 3 | 3 | 0 | 3 | 0.298% | [1, 1, 0, 1, 0, 0, 0, 0] |
| 53 | 7 | 5 | 3 | 0 | 1 | 3 | 0.428% | [1, 1, 0, 1, 1, 1, 1, 1] |

TABLE 10-continued

| $s_1 +$ $(s_2 * 4) +$ $(s_3 * 16) + 1$ | $Q_{q1}$ | $Q_{q2}$ | $Q_{q3}$ | $s_1$ | $s_2$ | $s_3$ | $P_{123}$ | $s_{cw}$ |
|---|---|---|---|---|---|---|---|---|
| 54 | 7 | 6 | 4 | 1 | 1 | 3 | 3.455% | [0, 1, 0, 0, 0] |
| 55 | 6 | 7 | 4 | 2 | 1 | 3 | 3.458% | [0, 0, 1, 1, 0] |
| 56 | 5 | 7 | 4 | 3 | 1 | 3 | 3.571% | [0, 0, 1, 0, 0] |
| 57 | 6 | 4 | 3 | 0 | 2 | 3 | 0.199% | [1, 1, 0, 0, 1, 0, 1, 0, 0] |
| 58 | 7 | 6 | 4 | 1 | 2 | 3 | 3.465% | [0, 0, 1, 0, 1] |
| 59 | 6 | 6 | 5 | 2 | 2 | 3 | 3.444% | [0, 1, 1, 1, 1] |
| 60 | 5 | 6 | 5 | 3 | 2 | 3 | 3.589% | [0, 0, 0, 0, 1] |
| 61 | 7 | 3 | 3 | 0 | 3 | 3 | 0.270% | [1, 1, 0, 1, 0, 1, 0, 0] |
| 62 | 7 | 5 | 5 | 1 | 3 | 3 | 3.596% | [1, 1, 1, 1] |
| 63 | 6 | 5 | 5 | 2 | 3 | 3 | 3.593% | [0, 0, 0, 0, 0] |
| 64 | 6 | 5 | 5 | 3 | 3 | 3 | 3.660% | [1, 1, 1, 0] |

It is noted that, in Table 10, scaling factor triplets having higher probabilities (e.g., greater than 3%) are assigned to $s_{cw}$ code words of fewer Qs bits. Thus, a relatively larger number of Qq bits are allotted to blocks having higher scaling factor triplet probabilities (e.g., greater than 3%). The efficiency of the encoder 1100 is improved in this manner, and Table 10 may be further balanced in various aspects to this end.

For example, after calculating the bit load for each code word $s_{cw}$, an initial code word table may be generated. However if, due to small block size, for example, the performance of the table is less than optimal, the table may be further modified and/or balanced. While, on average, the probability of large amplitude samples (e.g., s=0 and 1) is relatively small and there may be sufficient numbers of low amplitude samples to distribute quantization bits, the distribution may vary too much within the bounds of a single block.

For a given code table, code words $s_{cw}$ are longest for the lowest probability scaling factor triplet combinations, thus leaving less quantization bits to encode actual samples. This may result in triplets which have large amplitude samples producing the largest contribution to EVM. In this context, the quantization error can be factored into code performance, and a new or modified code table can be built.

Generally, the criterion for an optimal code table is to minimize E=SUM(E(cw)*P(cw)), where E(cw) is code word quantization error and P(cw) is code word probability. Since VLC operates on a complete binary tree, in order to improve E(cw) for a given code word, the code word must be placed closer to the root (e.g., as a shorter prefix code), which requires pushing another code word cw' (or multiple code words cw') to further locations in the tree and therefore increasing E(cw'). Due to this property, performance of the code table improves if ΔE(cw)*P(cw)>SUMcw'(ΔE(cw')*P(cw')), where cw is a code word pulled closer to the root, cw' is a code word or set of code words pushed to further locations in the tree, and ΔE is the change in quantization error.

Alternatively, P'(cw) can be generated from P(cw) in such a way that, for the code words with E(cw)*P(cw) above an average, P'(cw)=P(cw)*(1+step), and for the code words with E(cw)*P(cw) below average, P'(cw)=P(cw)*(1−step). Iterations continue until the change in the code table does not improve the average error. It is noted that some iterations may not trigger a code change as a code word allocation across the binary tree, and should not count as exit criteria. Using various method of code rebalancing, such as those described above, a code table for a block size of Ns=3 samples may be improved.

Referring again to Table 10, it is noted that each of the scaling code words $s_{cw}$ unambiguously identifies the scaling factor of each of the samples in the block and, hence, unambiguously identifies the scaling factor/sample position relationship of each of the samples in the block. Because the set of values for the scaling factors $s_1$, $s_2$, and $s_3$ are limited to the range of 0-3, where a value of 3 is representative of all scaling factors of 3 or larger, the scaling factors of 0, 1, and 2 are represented unambiguously. Thus, implicity can be used to encode an additional MSB for any sample having a scaling factor of 0, 1, or 2. In Table 10, the numbers of quantization bits $Q_{q1}$, $Q_{q2}$, and $Q_{q3}$ include a bit added by the use of implicity. The additional ability of the encoder 1100 to use implicity for samples having scaling factors of 0, 1, or 2 tends to enhanced performance.

Table 10 also lists example numbers of quantization bits $Q_{q1}$, $Q_{q2}$, and $Q_{q3}$ associated with the $s_1$, $s_2$, and $s_3$ scaling factor triplets. As one example of spreading or apportioning bits for a block which remain after the bit load of the code word $s_{cw}$, the following Matlab® pseudo-code may apportion the remaining bits among the quantization $Q_{q1}$, $Q_{q2}$, and $Q_{q3}$ bits. The apportioning is generally based on the total number of bits available per block and the size of the code word $s_{cw}$ for the scaling factor triplet of the block. It is noted that at least one physical bit per sample is required to apply implicity.

```
% Allocating Implicit bits
M = 3;
Q = [0 0 0];
    if S1~=M Q(1) = 1; end
    if S2~=M Q(2) = 1; end
    if S3~=M Q(3) = 1; end
% Allocating available code word bits
    for z=1:BlockCodeSize-Code wordSize(S1,S2,S3)
        % Finding highest error sample out of 3
        [~, idx]=min(Q(:)+ [S1 S2 S3]);
        Q(idx2)= Q(idx2)+1;
    end
% If Q ==1 and it's implicit bit, set it to zero
    if S1~=M && Q(1) ==1 Q(1) = 0; end
    if S2~=M && Q(2) ==1 Q(2) = 0; end
    if S3~=M && Q(3) ==1 Q(3) = 0; end
```

Using the $s_1$, $s_2$, $s_3$ scaling factor triplet for a block and the number of quantization bits $Q_{q1}$, $Q_{q2}$, and $Q_{q3}$ for each sample in the block, as provided by the M-D implicit prefix code word generator 1106, the block scaler 1102 scales the samples in the block, and the quantizer 1104 quantizes the scaled samples. The framer 1108 receives a block of quantized samples $siq_q$ from the quantizer 1104 and the code word $s_{cw}$ from M-D implicit prefix code word generator 1106, and frames the block and the code word $s_{cw}$ into a frame. In various embodiments, the framer 1108 may receive several blocks of quantized samples from the quantizer 1104 and several code words $s_{cw}$ from the M-D implicit prefix code word generator 1106, and arrange or frame them into one or more frames, packets, or any other suitable package for data communications over the transport channel 150 (FIG. 2), for example.

Figure 12:
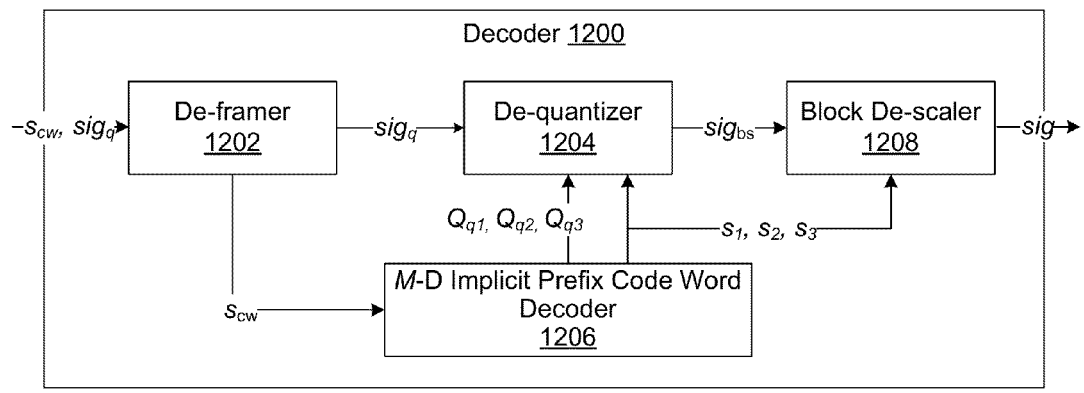
FIG. 12 illustrates an example decoder using multi-dimensional implicit adaptive quantization in the communications system of FIG. 2 according to an example embodiment.

FIG. 12 illustrates an example decoder 1200 using multi-dimensional implicit adaptive quantization in the communications system of FIG. 2 according to an example embodiment. In one embodiment, the decoder 1200 may be relied upon in place of the decoder 230 in FIG. 2. The decoder 1200 includes a de-framer 1202, an M-D implicit prefix code word decoder 1206, a de-quantizer 1204, and a block de-scaler 1208. Generally, the decoder 1200 works to reverse the order of operation of the encoder 1100, and the elements of the decoder 800 may be embodied as one or more general- or specific-purpose processors or processing circuits.

The de-framer 1202 extracts a sequence of quantized samples $sig_q$ in a block and a code word $s_{cw}$ from a received frame or packet, and provides them to the de-quantizer 806 and the M-D implicit prefix code word decoder 1206, respectively. In turn, the M-D implicit prefix code word decoder 1206 decodes the code word $s_{cw}$ into, for example, a number of quantization bits $Q_{q1}$, $Q_{q2}$, and $Q_{q3}$ and $s_1$, $s_2$, $s_3$ scaling factor triplet values for each sample in the block, and provides these values to the de-quantizer 1204 and the de-scaler 1208. The de-quantizer 1204 de-quantizes the sequence of samples $sig_q$ in the block based on the quantization bits $Q_{q1}$, $Q_{q2}$, and $Q_{q3}$ and the $s_1$, $s_2$, $s_3$ scaling factor triplet values, which identify where, if any, implicitly encoded bits exist in the block. After de-quantization, the block de-scaler 1208 de-scales the sequence of de-quantized samples $sig_{bs}$ based on the $s_1$, $s_2$, $s_3$ scaling factors.

At least in certain aspects, M-D implicit adaptive quantization using the encoder 1100 and the decoder 1200 tends to improve signal quality (e.g., provides lower quantization error) as compared to the use of, for example, implicit or explicit fixed-MSB quantization.

It should be appreciated that, although the embodiments of the encoders 700, 900, and 1100 have been described independently, certain operating aspects and principles of the respective encoders 700, 900, and 1100 may be used in combination with each other, to arrive at other advantages in encoding. Similarly, although the embodiments of the decoders 800, 1000, and 1200 have been described independently, certain operating aspects and principles of the respective decoders 800, 1000, and 1200 may be used in combination with each other, to arrive at other advantages in decoding.

E. Encoder and Decoder Processes

Before turning to the process flow diagrams of FIGS. 13-18, it is noted that the embodiments described herein may be practiced using an alternative order of the steps illustrated in FIGS. 13-18. That is, the process flows illustrated in FIGS. 13-18 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments.

E.1 Implicit Quantization Encoding and Decoding Processes

Figure 13:
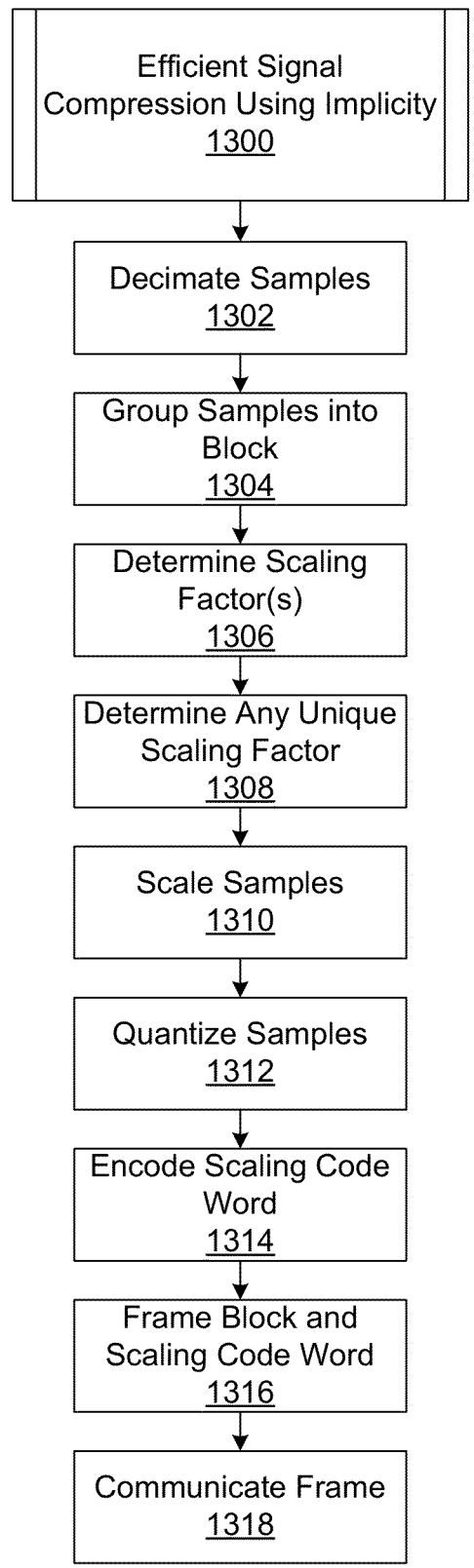
FIG. 13 illustrates a process of efficient signal compression using implicity which may be performed by the encoder of FIG. 7 according to an example embodiment.

FIG. 13 illustrates a process 1300 of efficient signal compression using implicity which may be performed by the encoder 700 of FIG. 7 according to an example embodiment. Although the process 1300 of FIG. 13 is described in connection with the encoder 700 of FIG. 7 and elements of the system 10 (FIGS. 1 and 2), it is noted that the process 1300 may be performed by other systems, encoders, or encoding devices.

The process 1300 includes decimating a sequence of samples at reference numeral 1302. With reference to FIG. 2, for example, the decimator 210 may decimate the sequence of samples, as described above. In various embodiments, the decimation ratio (i.e., L/M) may be selected for suitable reduction in data throughput, while still maintaining signal quality, or based on other factors and considerations. In some embodiments, the decimating at reference numeral 1302 may be omitted.

At reference numeral 1304, the process 1300 includes grouping a set of the sequence of samples into a block. The grouping at reference numeral 1304 may be performed to select the number of samples Ns per block, based upon various considerations described herein. It is noted that larger or smaller numbers of samples may be more or less desirable depending upon the application of the system and various system parameters. The grouping may be performed by the encoder 700 of FIG. 7, for example.

At reference numeral 1306, the process 1300 includes determining at least one scaling factor (i.e., s) for the set of samples in the block. In some embodiments, at reference numeral 1306, the process 1300 includes determining a scaling factor for each of the samples in the block and/or a block scaling factor for the block. Further, at reference numeral 1308, the process 1300 includes determining whether a unique scaling factor exists among the samples in the block and, in some embodiments, determining whether a unique minimum scaling factor exists among the scaling factors of each of the samples in the block. If a unique scaling factor does exist, a position or position factor (i.e., p) may be determined. The processes at reference numerals 1306 and 1308 may be performed by the scaling factor identifier 706 of the encoder 700, for example, as described above.

At reference numeral 1310, the process 1300 includes scaling sign extension bits from the set of samples in the block to provide a set of scaled samples in the block. More particularly, at reference numeral 1310, the process 1300 includes scaling the sign extension bits based on the scaling factor and whether the unique scaling factor exists, as determined at reference numerals 1306 and 1308, respectively. The processes at reference numeral 1310 may be performed by the block scaler 702 of the encoder 700, for example, as described above. Here, it is noted that, as described above, if a unique minimum scaling factor exists in the block, an additional sign extension bit may be scaled from each of the samples in the block, using implicity.

At reference numeral 1312, the process 1300 includes quantizing the set of scaled samples in the block to provide a set of quantized samples in the block. More particularly, at reference numeral 1310, the process 1300 includes quantizing the set of scaled samples in the block according to whether the unique scaling factor exists, as described above in connection with the encoder 700 of FIG. 7. The processes at reference numeral 1312 may be performed by the quantizer 704 of the encoder 700, for example, as described above. In one embodiment, the quantizing includes quantizing the set of samples using SQT quantization levels, which are determined according to a minimum mean square quantization error and a probability distribution of the samples.

At reference numeral 1314, the process 1300 includes encoding a scaling code word for the block based on a number of sign extension bits scaled from the samples in the block at reference numeral 1310 and whether the unique scaling factor exists. The processes at reference numeral 1314 may be performed by the code word generator 708 of the encoder 700, for example, according to the operation of the code word generator 708 described above. It is noted that, the code word generated at reference numeral 1314 is representative of both the scaling factor (i.e., s) for the set of samples in the block and, if any, the position or position factor (i.e., p) associated with a unique minimum number of sign extension bits among the set of samples in the bock, for example, as described above in connection with Tables 4 and 5.

At reference numeral 1316, the process 1300 includes framing the block quantized at reference numeral 1312 and the scaling code word encoded at reference numeral 1314 into a frame. In various embodiments, the framing may include framing or arranging several blocks of quantized samples and several code words into one or more frames, packets, or any other suitable package for data communications. The processes at reference numeral 1316 may be performed by the framer 710 of the encoder 700, for example, as described above. Finally, at reference numeral 1318, the process 1300 includes communicating the frame, frames, packets, or other package which was generated at reference numeral 1314. The data may be communicated over the transport channel 150 (FIG. 1 or FIG. 2), for example.

Figure 14:
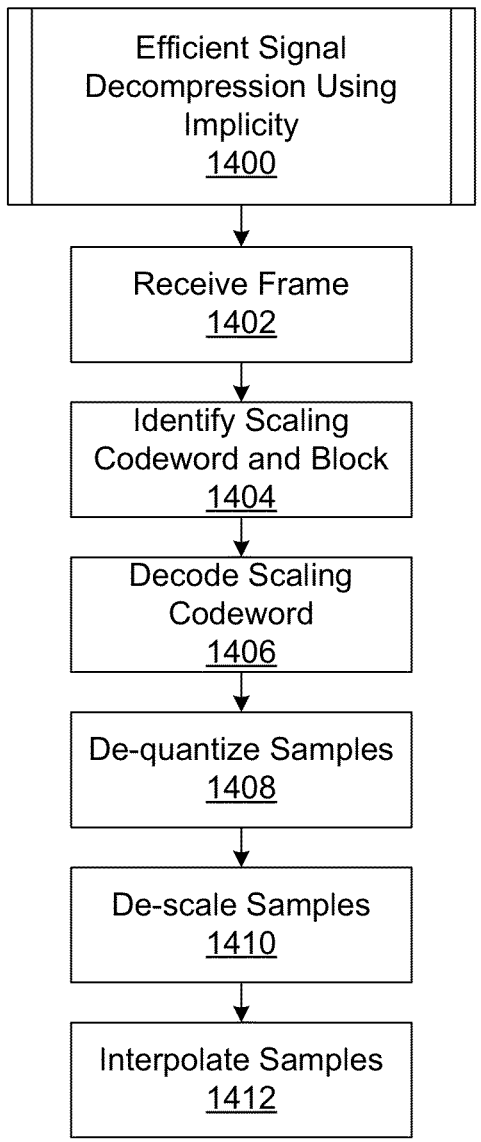
FIG. 14 illustrates a process of efficient signal decompression using implicity which may be performed by the decoder of FIG. 8 according to an example embodiment.

FIG. 14 illustrates a process 1400 of efficient signal decompression using implicity which may be performed by the decoder 800 of FIG. 8 according to an example embodiment. Although the process 1400 of FIG. 14 is described in connection with the decoder 800 of FIG. 8 and elements of the system 10 (FIGS. 1 and 2), it is noted that the process 1400 may be performed by other systems, decoders, or decoding devices.

At reference numeral 1402, the process 1400 includes receiving a frame. The frame may be received by the decoder 800 of FIG. 8. At reference numeral 1404, the process 1400 includes identifying or extracting a scaling code word and a block from the frame. The block and the scaling code word may be identified and/or extracted from the frame by the de-framer 802 of the decoder 800, as described above. At reference numeral 1406, the process 1400 includes decoding the scaling code word to determine a scaling factor (i.e., s) for samples in the block and, if present, a position factor (i.e., p) of an implicit bit among the samples in the block. The decoding may be performed by the code word decoder 804 of the decoder 800, for example, as described above.

At reference numeral 1408, the process 1400 includes de-quantizing the samples in the block based on the scaling factor and, if present, the position of the implicit bit determined at reference numeral 1406. The de-quantizing may be performed by the de-quantizer 806 of the decoder 800, for example, according to the operation of the de-quantizer 806 described above. At reference numeral 1410, the process 1400 includes de-scaling the samples in the block based on the scaling factor and the position of the implicit bit determined at reference numeral 1406. The de-scaling may be performed by the de-scaler 808 of the decoder 800, for example, as described above. Finally, at reference numeral 1412, the process 1400 includes interpolating the samples in the block. The interpolating may be performed by the interpolator 240 (FIGS. 1 and 2), as described above. In some embodiments, the interpolating at reference numeral 1412 may be omitted.

At least in certain aspects, the implicit quantization encoding and decoding processes 1300 and 1400 tend to improve signal quality (i.e., provide lower quantization error) as compared to the use of, for example, explicit quantization encoding and decoding processes.

E.2 Inter-Block Adaptive Quantization Encoding and Decoding Processes

Figure 15:
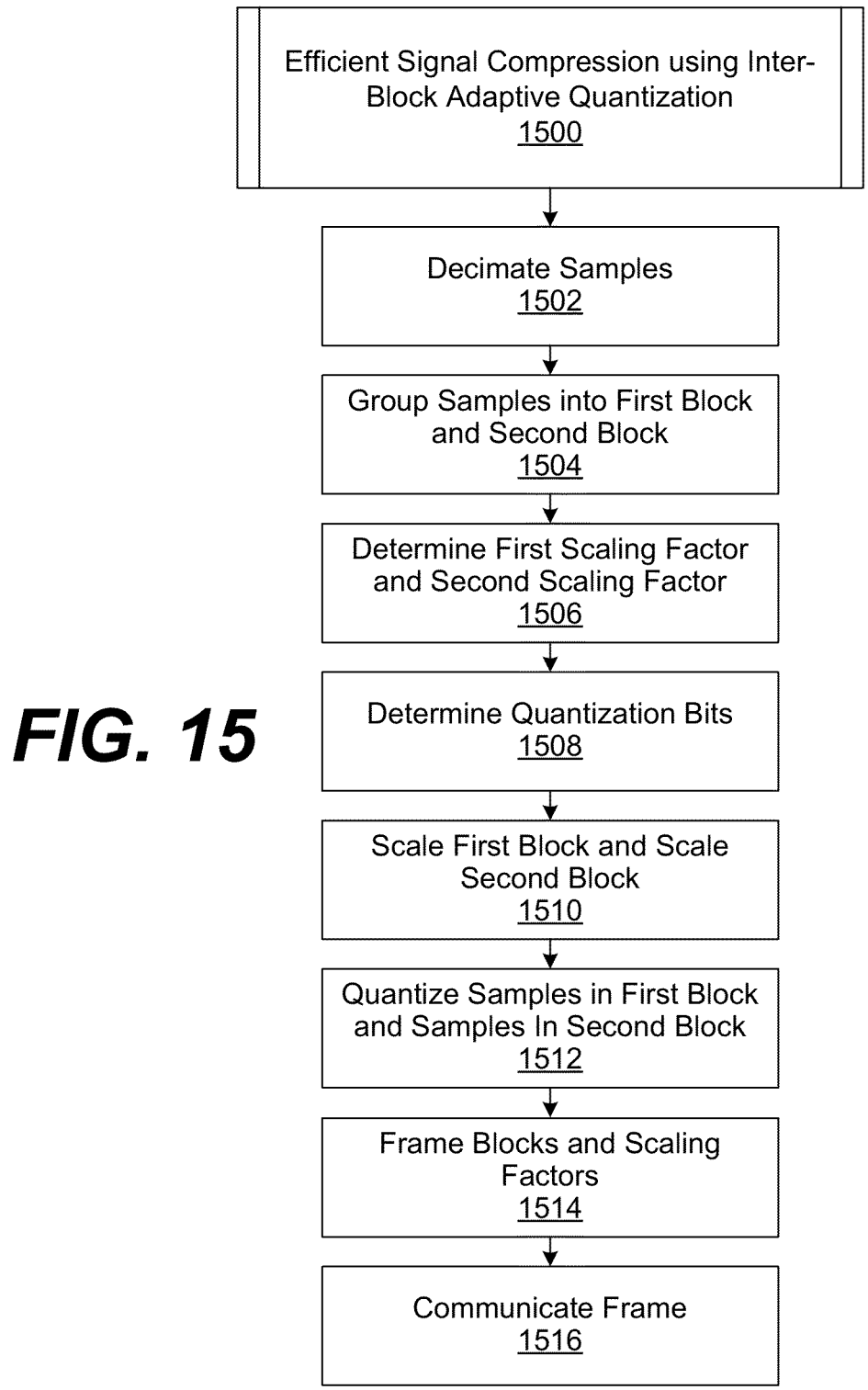
FIG. 15 illustrates a process of efficient signal compression using inter-block adaptive quantization which may be performed by the encoder of FIG. 9 according to an example embodiment.

FIG. 15 illustrates a process 1500 of efficient signal compression using inter-block adaptive quantization which may be performed by the encoder 900 of FIG. 9 according to an example embodiment. Although the process 1500 of FIG. 15 is described in connection with the encoder 900 of FIG. 9 and elements of the system 10 (FIGS. 1 and 2), it is noted that the process 1500 may be performed by other systems, encoders, or encoding devices.

The process 1500 includes decimating a sequence of samples at reference numeral 1502. With reference to FIG. 2, for example, the decimator 210 may decimate the sequence of samples. In some embodiments, the decimating at reference numeral 1302 may be omitted. At reference numeral 1504, the process 1500 includes grouping a set of the sequence of samples into first and second blocks. For example, at reference numeral 1504, the process 1500 may include grouping at least a portion of a set of samples into a set of first samples in a first block, and grouping at least another portion of the set of samples into a set of second samples in a second block. In one embodiment, the grouping at reference numeral 1504 may include grouping samples into the first block and the second block to maintain a substantially constant noise floor among blocks in a macro-block, as described herein. The grouping may be performed by the encoder 900 of FIG. 9, for example.

At reference numeral 1506, the process 1500 includes determining a first scaling factor for the set of first samples in the first block based on sign extension bits of the first samples. In some embodiments, at reference numeral 1506, the process 1500 includes determining the first scaling factor or block scaling factor for the first block based on scaling factors of each of the first samples in the first block. At reference numeral 1506, the process 1500 further includes determining a second scaling factor for the set of second samples in the second block based on sign extension bits of the second samples. In some embodiments, at reference numeral 1506, the process 1500 includes determining a scaling factor or block scaling factor for the second block based on scaling factors of each of the second samples in the second block. The processes at reference numeral 1506 may be performed by the first and second scaling factor identifiers 906 and 916 of the encoder 900, for example, as described above.

At reference numeral 1508, the process 1500 includes determining a first number of quantization bits for quantizing the first samples in the first block and a second number of quantization bits for quantizing the second samples in the second block. More particularly, reference numeral 1508 may include determining, based on a balance of the first scaling factor and the second scaling factor, a first number of quantization bits and a second number of quantization bits. The processes at reference numeral 1508 may be performed by the adaptive Q-bit selector 920 of the encoder 900, for example, as described above in connection with Tables 8 and 9. Particularly, the Q-bit selector 920 may determine the first and second quantization bits based on the first and second scaling factors to help balance any difference in the noise floor among the first and second blocks.

At reference numeral 1510, the process 1500 includes scaling sign extension bits from the first block to provide a set of scaled first samples in the first block, and scaling sign extension bits from the second block to provide a set of scaled second samples in the second block. The processes at reference numeral 1510 may be performed by the first and second block scalers 902 and 912 of the encoder 900, for example, as described above.

At reference numeral 1512, the process 1500 includes quantizing the first block using the first number of quantization bits to provide a set of quantized first samples in the first block, and quantizing the second block using the second number of quantization bits to provide a set of quantized second samples in the second block. The processes at reference numeral 1512 may be performed by the first and second quantizers 904 and 914 of the encoder 900, for example, as described above.

At reference numeral 1514, the process 1500 includes framing the first scaling factor, the second scaling factor, the first block, and the second block into a frame. In various embodiments, the framing may include framing or arranging several blocks of quantized samples and scaling code words into one or more frames, packets, or any other suitable package for data communications. The processes at reference numeral 1514 may be performed by the framer 910 of the encoder 900, for example, as described above. Finally, at reference numeral 1516, the process 1500 includes communicating the frame, frames, packets, or other package which was generated at reference numeral 1514. The data may be communicated over the transport channel 150 (FIG. 1 or FIG. 2), for example.

Figure 16:
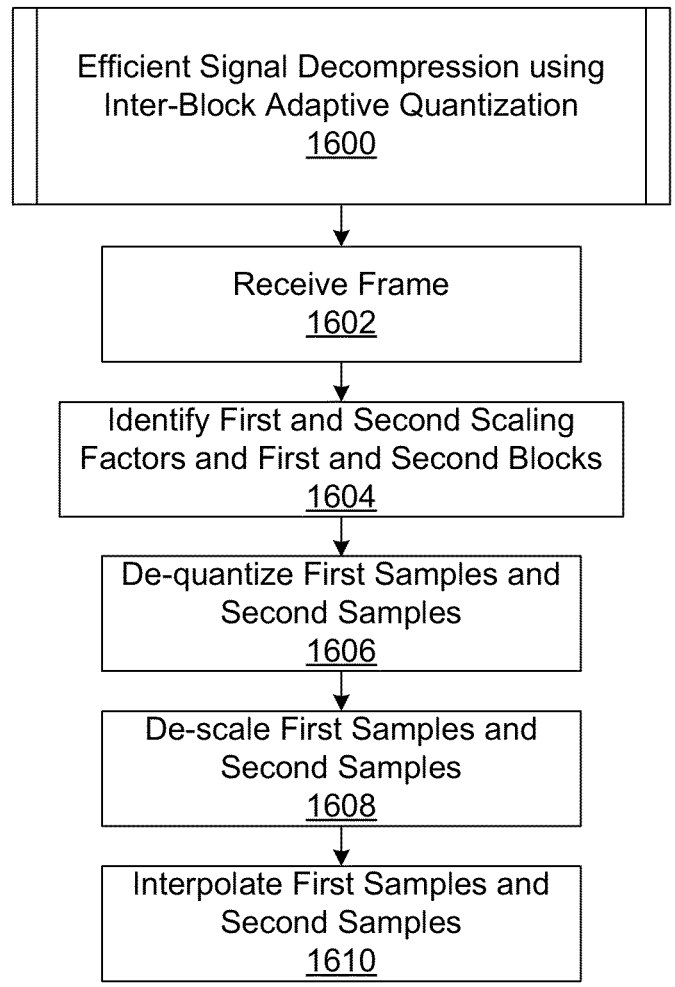
FIG. 16 illustrates a process of efficient signal decompression using inter-block adaptive quantization which may be performed by the decoder of FIG. 10 according to an example embodiment.

FIG. 16 illustrates a process 1600 of efficient signal decompression using inter-block adaptive quantization which may be performed by the decoder 1000 of FIG. 10 according to an example embodiment. Although the process 1600 of FIG. 16 is described in connection with the decoder 1000 of FIG. 10 and elements of the system 10 (FIGS. 1 and 2), it is noted that the process 1600 may be performed by other systems, decoders, or decoding devices.

At reference numeral 1602, the process 1600 includes receiving a frame. The frame may be received by the decoder 1000 of FIG. 10. At reference numeral 1604, the process 1600 includes identifying or extracting a first scaling code word, a second scaling code word, a first block, and a second block from the frame. The first and second scaling factors and the first and second blocks may be identified and/or extracted from the frame by the de-framer 1002 of the decoder 1000, as described above.

At reference numeral 1606, the process 1600 includes de-quantizing the first samples in the first block based on the first scaling factor, and de-quantizing the second samples in the second block based on the second scaling factor. The de-quantizing of the first and second blocks may be performed by the first and second de-quantizers 1004 and 1006 of the decoder 1000, for example, as described above. At reference numeral 1608, the process 1600 includes de-scaling the first samples in the first block based on the first scaling factor, and de-scaling the second samples in the second block based on the second scaling factor. The de-scaling of the first and second blocks may be performed by the first and second block de-scalers 1008 and 1010 of the decoder 1000, for example, as described above.

Finally, at reference numeral 1610, the process 1600 includes interpolating the samples in the first and second blocks. The interpolating may be performed by the interpolator 240 (FIGS. 1 and 2), as described above. In some embodiments, the interpolating at reference numeral 1610 may be omitted.

At least in certain aspects, the inter-block adaptive quantization encoding 1500 and decoding 1600 processes tend to improve signal quality (i.e., provide lower quantization error) as compared to the use of, for example, implicit or explicit 6-MSB quantization.

E.3 M-D Implicit Adaptive Quantization Encoding and Decoding Processes

Figure 17:
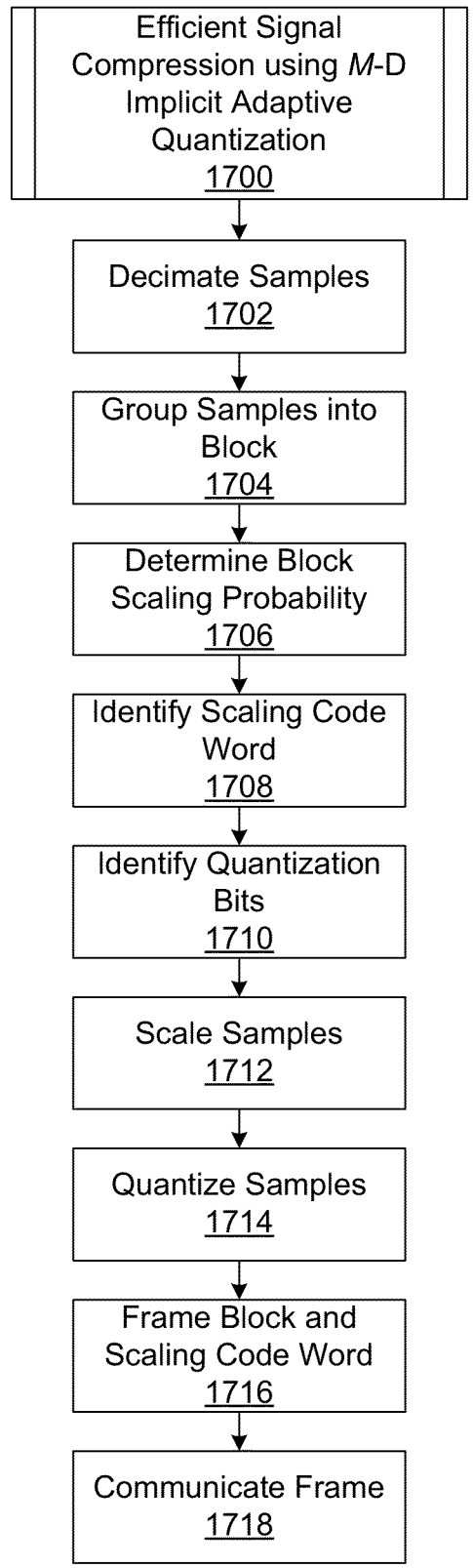
FIG. 17 illustrates a process of efficient signal compression using multi-dimensional implicit adaptive quantization which may be performed by the encoder of FIG. 11 according to an example embodiment.

FIG. 17 illustrates a process 1700 of efficient signal compression using multi-dimensional implicit adaptive quantization which may be performed by the encoder 1100 of FIG. 11 according to an example embodiment. Although the process 1700 of FIG. 17 is described in connection with the encoder 1100 of FIG. 11 and elements of the system 10 (FIGS. 1 and 2), it is noted that the process 1700 may be performed by other systems, encoders, or encoding devices.

The process 1700 includes decimating a sequence of samples at reference numeral 1702. With reference to FIG. 2, for example, the decimator 210 may decimate the sequence of samples. In some embodiments, the decimating at reference numeral 1702 may be omitted. At reference numeral 1704, the process 1700 includes grouping a set of samples into a block. The grouping at reference numeral 1704 may be performed to select the number of samples Ns per block, based upon various considerations described herein. The grouping may be performed by the encoder 1100 of FIG. 11, for example.

At reference numeral 1706, the process 1700 includes determining a block scaling probability for the block based on the scaling factor of each sample in the block. To this end, the process at reference numeral 1706 may include identifying a scaling factor for each sample in the block, and determining the block scaling probability based on the scaling factors of the samples in the block. For example, for a block of Ns=3 samples, where $s_1$, $s_2$, and $s_3$ are the respective scaling factors of the 3 samples in the block, and $P(s_1)$, $P(s_2)$, and $P(s_3)$ are the probabilities of the respective scaling factors, the block scaling probability for the block is equivalent to $P(s_1)*P(s_2)*P(s_3)$. The processes at reference numeral 1706 may be performed by the M-D implicit prefix code word generator 1106 of the encoder 1100, for example, as described above. Alternatively, the processes at reference numeral 1706 may be performed offline. In this case, a coding table including a scaling code word matched to a block scaling probability for each combination of scaling factors in the block may be determined offline and stored in the M-D implicit prefix code word generator 1106. The set of scaling code words for the combinations of scaling factors may form a variable length prefix code set.

At reference numeral 1708, the process 1700 includes identifying a scaling code word for the block based on the block scaling probability. For example, at reference numeral 1708, reference may be made to a variable length prefix code set. The variable length prefix code set may be determined in connection with the probability of respective scaling factors of samples in the block, as described above at reference numeral 1706. The processes at reference numeral 1708 may be performed by the M-D implicit prefix code word generator 1106 of the encoder 1100, for example, as described above.

At reference numeral 1710, the process 1700 includes identifying a number of quantization bits for each sample in the block based on a number of bits of the scaling code word and a number of bits of the block. Here, a number of quantization bits for each sample may be selected by spreading the remaining bits of the block among the samples to achieve a near-equal noise floor for the samples. In this context, the processes at reference numeral 1710 may be performed by the M-D implicit prefix code word generator 1106 of the encoder 1100, for example, as described above. For example, for a block size of 20 bits and Ns=3 samples, if the M-D implicit prefix code word generator 1106 identifies a scaling code word of 6 bits at reference numeral 1708, 14 bits are remaining in the block for quantization of the 3 samples of the block, and the M-D implicit prefix code word generator 1106 spreads or apportions those 14 bits among the quantization bits to achieve a near-equal noise floor among the samples.

At reference numeral 1712, the process 1700 includes, for each sample in the block, scaling sign extension bits from the sample according to the scaling factor for the sample, to provide a set of scaled samples in the block. The processes at reference numeral 1712 may be performed by the block scaler 1102 of the encoder 1100, for example, as described above. At reference numeral 1714, the process 1700 includes, for each scaled sample in the block, quantizing the scaled sample according to the number of quantization bits for the sample, to provide a set of quantized samples in the block. The processes at reference numeral 1714 may be performed by the quantizer 1104 of the encoder 1100, for example, as described above. The number of quantization bits may be specified by the M-D implicit prefix code word generator 1106, as determined according to the processes at reference numeral 1710.

At reference numeral 1716, the process 1700 includes framing the block and the scaling code word into a frame. In various embodiments, the framing may include framing or arranging several blocks of quantized samples and scaling words into one or more frames, packets, or any other suitable package for data communications. The processes at reference numeral 1716 may be performed by the framer 1108 of the encoder 1100, for example, as described above. Finally, at reference numeral 1718, the process 1700 includes communicating the frame, frames, packets, or other package which was generated at reference numeral 1716. The data may be communicated over the transport channel 150 (FIG. 1 or FIG. 2), for example.

Figure 18:
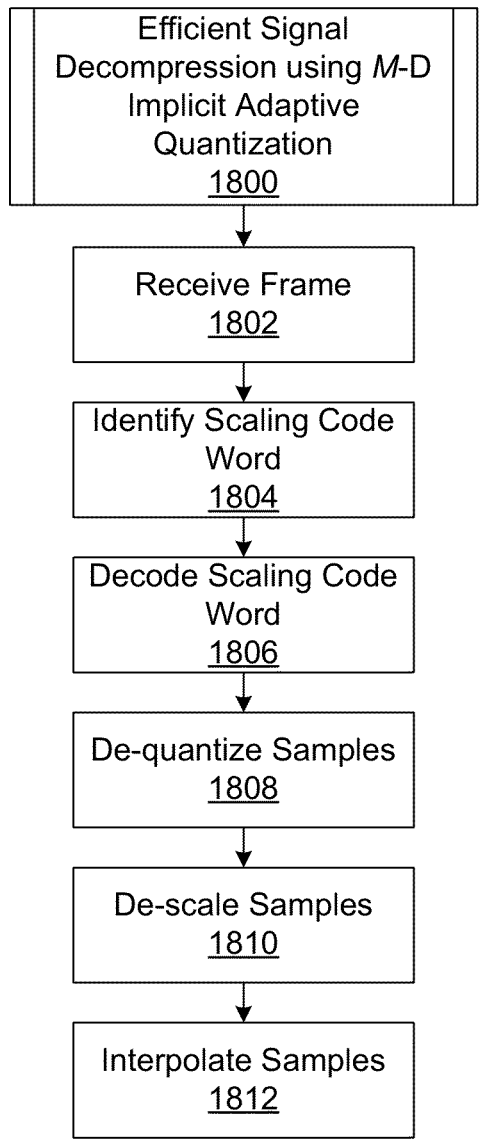
FIG. 18 illustrates a process of efficient signal decompression using multi-dimensional implicit adaptive quantization which may be performed by the decoder of FIG. 12 according to an example embodiment.

FIG. 18 illustrates a process 1800 of efficient signal decompression using multi-dimensional implicit adaptive quantization which may be performed by the decoder 1200 of FIG. 12 according to an example embodiment. Although the process 1800 of FIG. 18 is described in connection with the decoder 1200 of FIG. 12 and elements of the system 10 (FIGS. 1 and 2), it is noted that the process 1800 may be performed by other systems, decoders or decoding devices.

At reference numeral 1802, the process 1800 includes receiving a frame. The frame may be received by the decoder 1200 of FIG. 12. At reference numeral 1804, the process 1800 includes identifying or extracting a scaling code word and a block from the frame. The block and the scaling code word may be identified and/or extracted from the frame by the de-framer 1202 of the decoder 1200, as described above. The scaling code word, for example, may be identified by a reverse table lookup using a table similar to Table 10.

At reference numeral 1806, the process 1800 includes decoding the scaling code word to determine a scaling factor for each of the samples in the block and whether implicit bits is encoded for one or more samples in the block. That is, the scaling code word identified at reference numeral 1802 may unambiguously identify the scaling factor of each of the samples in the block and, hence, unambiguously identify the scaling factor/sample position relationship of each of the samples in the block, as described above. When using a set of values for scaling factors limited to a range, a scaling factor greater than a certain value may be representative of all scaling factors of that certain value or larger, and scaling factors equal to or less than the certain value may be unambiguously associated with sample position. Thus, implicity can be used to encode an additional MSB for any sample having a scaling factor of equal to or less than the certain value. The decoding may be performed by the M-D implicit prefix code word decoder 1206 of the decoder 1200, for example, as described above.

At reference numeral 1808, the process 1800 includes de-quantizing the samples in the block based on the scaling factors of the samples and, if present, the identification of the positions of implicit bits among the samples. The de-quantizing may be performed by the de-quantizer 1204 of the decoder 1200, for example, as described above. At reference numeral 1810, the process 1800 includes de-scaling the samples in the block based on the scaling factors of the samples and, if present, the identification of the positions of implicit bits among the samples. The de-scaling may be performed by the de-scaler 1208 of the decoder 1200, for example, as described above. Finally, at reference numeral 1812, the process 1800 includes interpolating the samples in the block. The interpolating may be performed by the interpolator 240 (FIG. 2), as described above. In some embodiments, the interpolating at reference numeral 1812 may be omitted.

At least in certain aspects, the M-D implicit adaptive quantization processes 1700 and 1800 tend to improve signal quality (i.e., provide lower quantization error) as compared to the use of, for example, implicit or explicit fixed-MSB quantization.

F. System Evaluation

To examine performance aspects of the system 10 using variations of the encoder and decoder architectures described above, a 20 MHz 64-Quadrate Amplitude Modulation (QAM) LTE Orthogonal Frequency Division Multiplex (OFDM) signal at 30.72 Msamples/second, using 15 bits/sample, was evaluated.

Figure 19:
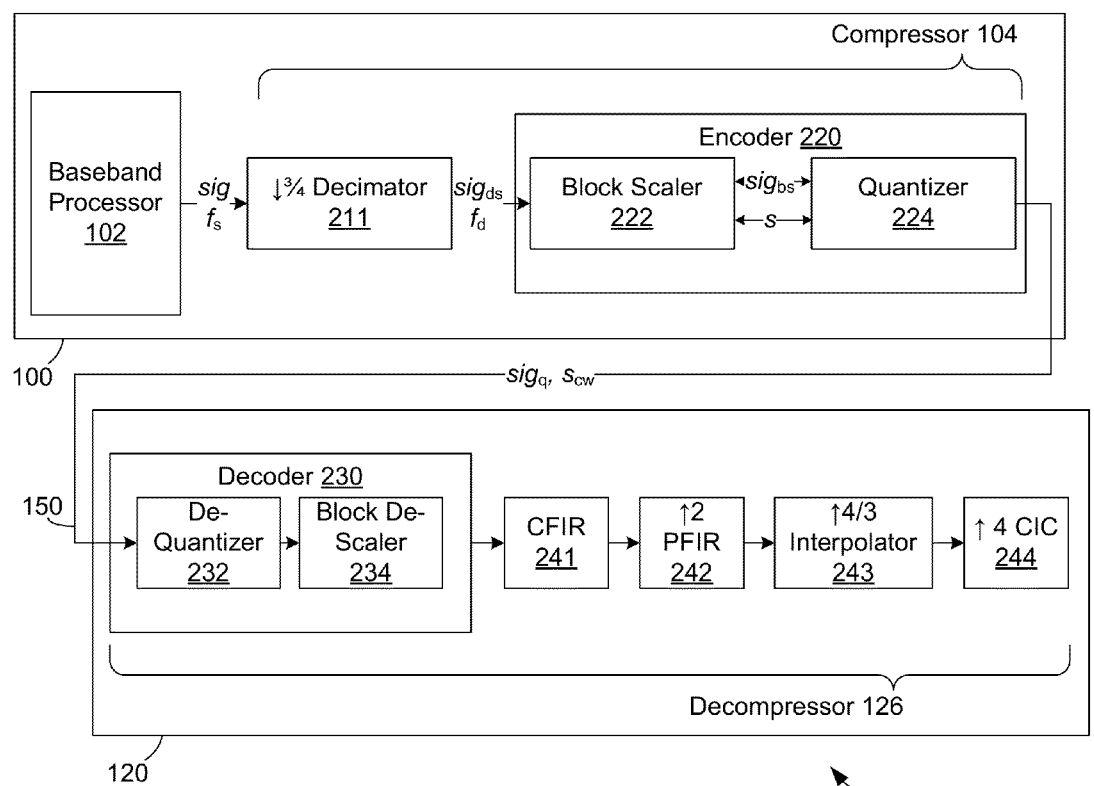
FIG. 19 illustrates an example practical system block diagram according to an example embodiment.

In the context of examining performance, FIG. 19 illustrates an example practical system block diagram according to an example embodiment. The system 20 in FIG. 19 is similar to the system 10 in FIGS. 1 and 2, but a decimation ratio of 3/4 (i.e., L/M=3/4) was selected for the decimator 211, and an interpolation ratio of 4/3 (i.e., M/L=4/3) was selected for the interpolator 243 (e.g., a farrow interpolator). The system 20 further includes elements which model existing elements in a decompressor, such as a Compensation Filter (CFIR) 240, a Programmable Filter (PFIR) 240, and a Cascaded Integrator-Comb (CIC) filter 244, each of which is part of the DUC.

In connection with the practical system 20, distortion was evaluated for various embodiments described herein, as measured according to RMS EVM. Generally, a higher EVM corresponds to a larger amount of data distortion caused by the compression algorithm. To evaluate each compression algorithm, a Vector Signal Analysis (VSA) tool, such as the Agilent 89600 VSA tool, may be relied upon to determine the RMS EVM for each compression algorithm.

Figure 20:
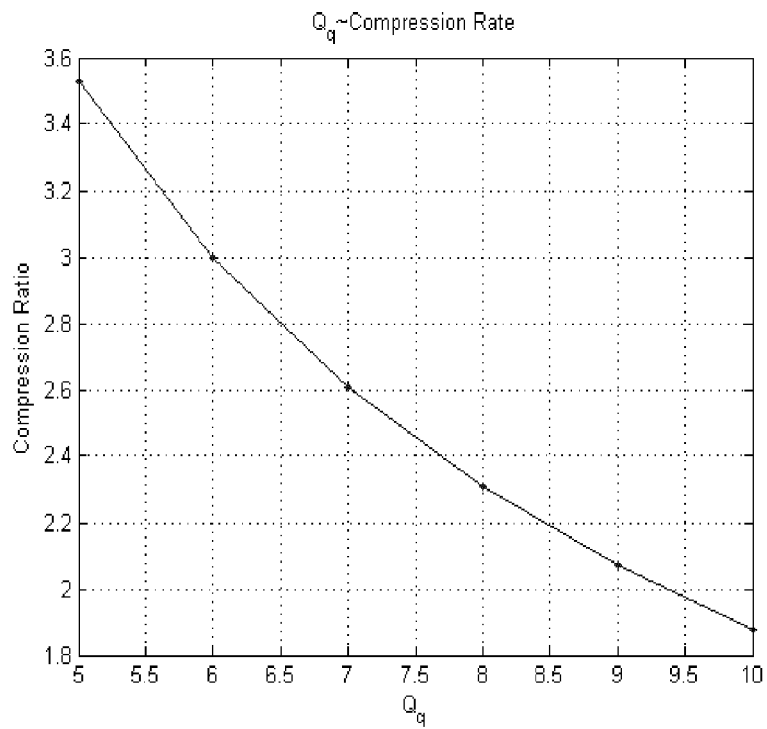
FIG. 20 illustrates compression ratio increasing as a function of quantization bits.
Figure 21:
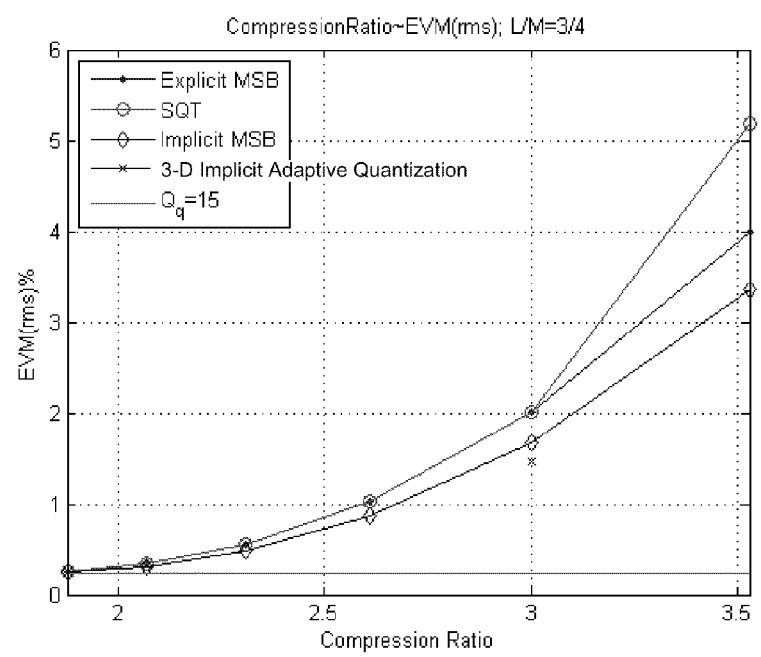
FIG. 21 illustrates bit-EVM curves for a 20 MHz LTE downlink for various compression algorithms.

In one aspect, the compression ratio increases as Qq decreases as shown in FIG. 20. FIG. 21 illustrates the bit-EVM (or bit-distortion) curves for the 20 MHz LTE downlink for various compression algorithms, as also outlined in Table 11 below. The lower bound is defined as a Qq of 15 bits. When less Qq bits are used, higher compression efficiency is obtained. However, the higher compression efficiencies tend to higher EVM values and larger distortion. At 6 Qq bits, which translates to a ⅓ compression rate originating from 15 bits, the EVM value of implicit MSB is evaluated to be 1.71%. In contrast, the explicit MSB and SQT methods are evaluated as having EVM values of 2.03%. As one example of system constraints for suitable data communications, the transmit EVM requirement may need to be no greater than 8% for LTE QAM-64.

It is noted that the output of CIC filter in the DUC is forwarded to the Crest Factor Reduction (CFR) processor. To investigate how these compression schemes impact the EVM value at the output of CFR, 2 (2.60 GHz and 2.68 GHz) 20 MHz LTE carriers are used to evaluate performance of various compression schemes against baseline conditions. In the existing CFR simulator, the resulting Peak to Average Ratio (PAR) is determined by a threshold value. The higher the threshold value, the higher the PAR value and the lower the EVM value. One design target is to have low PAR with low EVM.

The results of the evaluation are shown in Table 11 below, which includes data points for (a) explicit 6-MSB quantization; (b) SQT 6-MSB quantization; (c) Implicit 6-MSB quantization; (d) 3-D Implicit 6-MSB quantization (i.e., M-D implicit quantization where M=3); (e) implicit 7-MSB quantization; and (f) explicit 9-MSB quantization. It is noted that the compression algorithm (e) provides almost the same EVM performance as baseline, but suffers from relatively poor line speed (i.e., compression rate), and the compression algorithm (d) has a larger offset as compared to baseline but with a better line speed than (e). While (a), (b) and (c) have 0.3333 compression rates, the EVM values are less desirable. It is also noted that (a) and (b) have almost the same performance, which is consistent with FIG. 21, which illustrates that explicit and SQT 6-MSB have almost same RMS EVM values. According to the data in Table 11, system parameters may be balanced to achieve overall satisfactory system performance.

Figure 22:
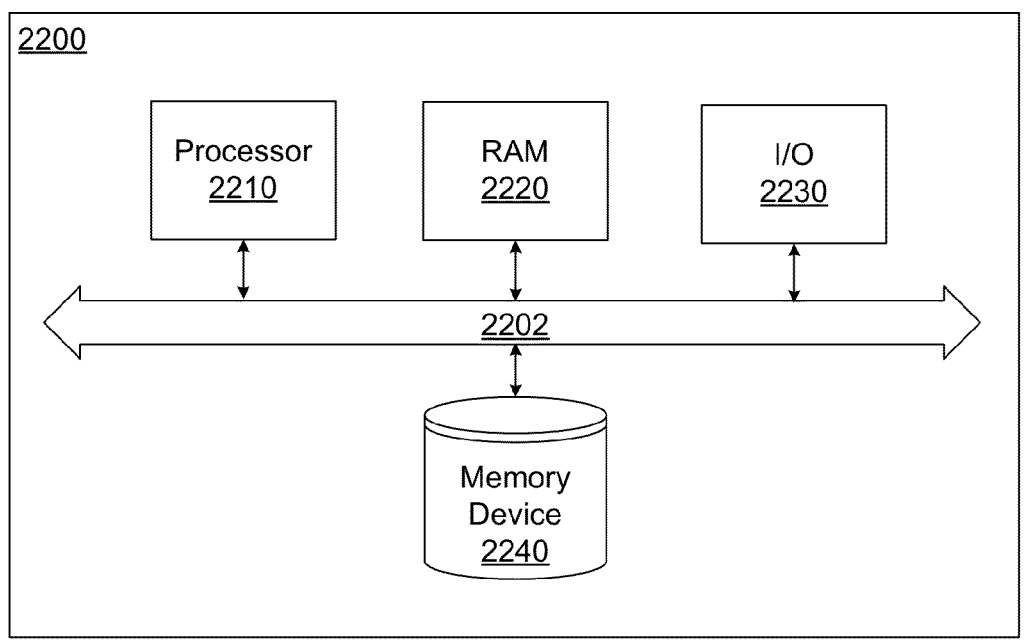
FIG. 22 illustrates an example schematic block diagram of a computing environment which may be employed by the system of FIG. 1 according to various embodiments.

FIG. 22 illustrates an example schematic block diagram of a computing architecture 2200 that may be employed by one or more elements of the system 10 of FIG. 1 or 2, according to various embodiments described herein. The computing architecture 2200 may be embodied, in part, using one or more elements of a mixed general and/or special purpose computer. The computing device 2200 includes a processor 2210, a Random Access Memory (RAM) 2220, an Input Output (I/O) interface 2230, and a memory device 2240. The elements of computing architecture 2200 are communicatively coupled via a local interface 2202. The elements of the computing architecture 2200 are not intended to be limiting in nature, as the architecture may omit elements or include additional or alternative elements.

In various embodiments, the processor 2210 may include or be embodied as a general purpose arithmetic processor, a state machine, or an ASIC, for example. In various embodiments, general- or specific-purpose processing circuits of FIG. 1 or 2 may be implemented, at least in part, using the computing architecture 2200 including the processor 2210. The processor 2210 may include one or more circuits, one or more microprocessors, ASICs, dedicated hardware, or any combination thereof. In certain aspects and embodiments, the processor 2210 is configured to execute one or more software modules which may be stored, for example, on the memory device 2240. The software modules may configure the processor 2210 to perform the tasks undertaken by the elements of FIG. 1, 2, or 7-12, for example. In certain embodiments, the processes 1300, 1400, 1500, 1600, 1700, or 1800 described in connection with may be implemented or executed by the processor 2210 according to instructions stored on the memory device 2240.

The RAM 1220 may include or be embodied as any random access and read only memory devices that store computer-readable instructions to be executed by the processor 2210. The memory device 2240 stores computer-readable instructions thereon that, when executed by the processor 2210, direct the processor 2210 to execute various aspects of the embodiments described herein.

As a non-limiting example group, the memory device 2240 may include one or more non-transitory memory devices, such as an optical disc, a magnetic disc, a semiconductor memory (i.e., a semiconductor, floating gate, or similar flash based memory), a magnetic tape memory, a removable

TABLE 11

| | | | | | | | System Cascade Performance | | | | | | | | | |
|---|---|---|---|---|---|---|---|---|---|---|---|---|---|---|---|---|
| | | | | | | CIC Out EVM | CFR PAR Out 6.30 dB | | CFR PAR Out 6.62 dB | | CFR PAR Out 7.05 dB | | CFR PAR Out 7.36 dB | | CFR PAR Out 7.77 dB | |
| Ghz | Blk Size | Line Speed | Codec | Bits/ Sampl | Qs | % Q64 | EVM % Q64 | ΔEVM % | EVM % Q64 | ΔEVM % | EVM % Q64 | Δ EVM % | EVM % Q64 | Δ EVM % | EVM % Q64 | Δ EVM % |
| 2.6 | 120 | 1 | N/A | 15 | 0 | 0.33 | 8.82 | — | 7.13 | — | 5.20 | — | 4.07 | — | 2.91 | — |
| 2.6 | 40 | 0.3333 | a | 6 | 4 | 2.03 | 9.01 | 0.19 | 7.42 | 0.29 | 5.57 | 0.37 | 4.54 | 0.47 | 3.53 | 0.62 |
| 2.6 | 40 | 0.3333 | b | 6 | 4 | 2.03 | 9.02 | 0.20 | 7.41 | 0.28 | 5.57 | 0.37 | 4.55 | 0.48 | 3.54 | 0.63 |
| 2.6 | 40 | 0.3333 | c | 6 | 4 | 1.71 | 8.98 | 0.16 | 7.33 | 0.20 | 5.46 | 0.26 | 4.42 | 0.35 | 3.39 | 0.48 |
| 2.6 | 40 | 0.3333 | d | 6 | 4 | 1.50 | 8.94 | 0.12 | 7.28 | 0.15 | 5.40 | 0.20 | 4.34 | 0.27 | 3.29 | 0.38 |
| 2.6 | 46 | 0.3833 | e | 7 | 4 | 0.93 | 8.87 | 0.05 | 7.18 | 0.05 | 5.25 | 0.05 | 4.16 | 0.09 | 3.03 | 0.12 |
| 2.6 | 58 | 0.4833 | f | 9 | 4 | 0.41 | 8.84 | 0.02 | 7.14 | 0.01 | 5.19 | −0.01 | 4.08 | 0.01 | 2.92 | 0.01 |
| 2.68 | 120 | 1 | N/A | 15 | 0 | 0.29 | 8.86 | — | 7.19 | — | 5.24 | — | 4.12 | — | 2.95 | — |
| 2.68 | 40 | 0.3333 | a | 6 | 4 | 2.03 | 9.04 | 0.18 | 7.43 | 0.24 | 5.59 | 0.35 | 4.57 | 0.45 | 3.55 | 0.60 |
| 2.68 | 40 | 0.3333 | b | 6 | 4 | 2.03 | 9.04 | 0.18 | 7.44 | 0.25 | 5.59 | 0.35 | 4.57 | 0.45 | 3.56 | 0.61 |
| 2.68 | 40 | 0.3333 | c | 6 | 4 | 1.70 | 8.94 | 0.08 | 7.33 | 0.14 | 5.44 | 0.20 | 4.39 | 0.27 | 3.36 | 0.41 |
| 2.68 | 40 | 0.3333 | d | 6 | 4 | 1.49 | 8.95 | 0.09 | 7.28 | 0.09 | 5.34 | 0.10 | 4.31 | 0.19 | 3.25 | 0.30 |
| 2.68 | 46 | 0.3833 | e | 7 | 4 | 0.91 | 8.91 | 0.05 | 7.23 | 0.04 | 5.30 | 0.06 | 4.20 | 0.08 | 3.07 | 0.12 |
| 2.68 | 58 | 0.4833 | f | 9 | 4 | 0.29 | 8.87 | 0.01 | 7.19 | 0.00 | 5.24 | 0.00 | 4.12 | 0.00 | 2.95 | 0.00 | memory, combinations thereof, or any other known non-transitory memory device or means for storing computer-readable instructions. The I/O interface 2230 includes device input and output interfaces, such as keyboard, pointing device, display, communication, and/or other interfaces. The one or more local interfaces 2202 electrically and communicatively couple the processor 2210, the RAM 2220, I/O interface 2230, and the memory device 2240, so that data and instructions may be communicated among them.

In certain aspects, the processor 2210 is configured to retrieve computer-readable instructions and data stored on the memory device 2240 and/or other storage means, and copy the computer-readable instructions to the RAM 2220 for execution. The processor 2210 is further configured to execute the computer-readable instructions to implement various aspects and features of the embodiments described herein. For example, the processor 2210 may be adapted or configured to execute the processes 1300, 1400, 1500, 1600, 1700, or 1800. In embodiments where the processor 2210 includes a state machine or ASIC, the processor 2210 may include internal memory and registers for maintenance of data being processed.

The flowchart or process diagrams of FIGS. 13-18 are representative of certain processes, functionality, and operations of embodiments described herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 2210. The machine code may be converted from the source code, etc. Further, each block may represent, or be connected with, a circuit or a number of interconnected circuits to implement a certain logical function or process step.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A method for communications, comprising:
grouping, with circuitry, a set of samples into a block;
determining, with the circuitry, at least one scaling factor for the set of samples in the block, the scaling factor being indicative of a number of redundant signs bits that can be removed from each sample in the block;
determining, by the circuitry, whether a unique scaling factor exists among the samples in the block;
scaling, with the circuitry, sign extension bits from the set of samples in the block using the scaling factor to provide a set of scaled samples in the block;
quantizing, with the circuitry, the set of scaled samples in the block to provide a set of quantized samples in the block; and
encoding, with the circuitry, a scaling code word for the block based on a number of sign extension bits scaled from the samples in the block and whether the unique scaling factor exists.

2. The method of claim 1, further comprising:
framing the block and the scaling code word into a frame; and
communicating the frame.

3. The method of claim 1, further comprising, before grouping the set of samples into the block, decimating the samples.

4. The method of claim 1, wherein:
the scaling comprises scaling the sign extension bits based on whether the unique scaling factor exists; and
the quantizing comprises quantizing the set of scaled samples in the block according to whether the unique scaling factor exists.

5. The method of claim 1, wherein:
determining at least one scaling factor for the set of samples in the block comprises determining a scaling factor for each of the samples in the block; and determining whether the unique scaling factor exists comprises sorting the scaling factors of each of the samples in the block.

6. The method of claim 1, wherein the scaling comprises, when the unique scaling factor exists, implicitly scaling an additional sign extension bit from each of the samples in the block.

7. The method of claim 1, wherein the quantizing comprises, when the unique scaling factor exists, implicitly quantizing an additional bit from each of the samples in the block.

8. The method of claim 1, wherein quantizing the set of samples in the block comprises quantizing the set of samples using quantization levels determined according to a minimum mean square quantization error and a probability distribution of the samples.

9. A method for communications, comprising:
determining, with circuitry, a first scaling factor for a set of first samples in a first block;
determining, with the circuitry, a second scaling factor for a set of second samples in a second block, the first and second scaling factors identifying a number of sign extension bits that can be removed from each sample in the first and second blocks, respectively;
scaling, with the circuitry, sign extension bits from the first block sing the first scaling factor to provide a set of first scaled samples in the first block, and scaling sign extension bits from the second block using the second scaling factor to provide a set of second scaled samples in the second block;
based on a balance of the first scaling factor and the second scaling factor, determining, by the circuitry, a first number of quantization bits and a second number of quantization bits; and
quantizing, with the circuitry, the first block using the first number of quantization bits, and quantizing the second block using the second number of quantization bits.

10. The method according to claim 9, further comprising:
framing the first scaling factor, the second scaling factor, the first block, and the second block into a frame; and
communicating the frame.

11. The method of claim 9, further comprising grouping samples into the first block and the second block to maintain a substantially constant noise floor among blocks in a macroblock.

12. The method of claim 9, further comprising decimating the set of first samples and the set of second samples.

13. The method of claim 9, wherein:
determining the first scaling factor comprises determining the first scaling factor based on scaling factors of each of the first samples; and
determining the second scaling factor comprises determining the second scaling factor based on scaling factors of each of the second samples.

14. The method of claim 9, wherein:
scaling sign extension bits from the first block comprises scaling each of the first samples by a first number of sign extension bits based on the first scaling factor; and
scaling sign extension bits from the second block comprises scaling each of the second samples by a second number of sign extension bits based on the second scaling factor.

15. A method for communications, comprising:
grouping, with circuitry, a set of samples into a block;
determining, with the circuitry, a scaling factor for each sample in the block, the scaling factor being indicative of a number of redundant signs bits that can be removed from each sample in the block;

determining, with the circuitry, a block scaling probability for the block based on the scaling factor of each sample in the block; and identifying, by the circuitry, a scaling factor for at least one sample in the block based on the block scaling probability.

16. The method of claim 15, further comprising encoding a scaling code word for the block based on the block scaling probability.

17. The method of claim 16, further comprising:
framing the block and the scaling code word into a frame; and communicating the frame.

18. The method of claim 15, further comprising, identifying a scaling factor for each sample in the block based on the block scaling probability; and for each sample in the block, scaling sign extension bits from the sample according to the scaling factor for the sample.

19. The method of claim 18, further comprising, for each sample in the block, when the scaling factor for the sample is equal to or less than a predetermined number, implicitly scaling an additional sign extension bit from the sample.

20. The method of claim 19, further comprising identifying a number of quantization bits for each sample in the block based on a number of bits of the scaling code word and a number of bits of the block.

* * * * *